US012700397B2

(12) United States Patent
Tabuchi

(10) Patent No.: US 12,700,397 B2
(45) Date of Patent: Aug. 4, 2026

(54) SOUND OUTPUT CONTROL DEVICE, SOUND OUTPUT CONTROL METHOD, AND SOUND OUTPUT CONTROL PROGRAM

(71) Applicant: PIONEER CORPORATION, Tokyo (JP)

(72) Inventor: Hiromasa Tabuchi, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 126 days.

(21) Appl. No.: 18/549,204

(22) PCT Filed: Mar. 17, 2021

(86) PCT No.: PCT/JP2021/010921
§ 371 (c)(1),
(2) Date: Sep. 6, 2023

(87) PCT Pub. No.: WO2022/195783
PCT Pub. Date: Sep. 22, 2022

(65) Prior Publication Data
US 2024/0153488 A1 May 9, 2024

(51) Int. Cl.
*G10L 13/10* (2013.01)
*G10L 13/033* (2013.01)
*G10L 15/22* (2006.01)

(52) U.S. Cl.
CPC ............ *G10L 13/10* (2013.01); *G10L 13/033* (2013.01); *G10L 15/22* (2013.01)

(58) Field of Classification Search
None
See application file for complete search history.

(56) References Cited

U.S. PATENT DOCUMENTS 10,956,761 B2 * 3/2021 Onaka .................... G06V 40/28
2014/0257541 A1 9/2014 Kitahara et al.
(Continued)

FOREIGN PATENT DOCUMENTS

CN 105096535 A * 11/2015
JP H08-339288 A 12/1996
(Continued)

OTHER PUBLICATIONS

Machine English language translation of JP-2019200486-A (Year: 2019).*
(Continued)

*Primary Examiner* — Michelle M Koeth
(74) *Attorney, Agent, or Firm* — Procopio, Cory, Hargreaves & Savitch LLP

(57) ABSTRACT

A sound output control device includes: an information acquiring unit that acquires agent information provided from each of a plurality of applications having a voice agent function; a reporting control unit that causes a reporting unit to report a voice message to which different sound effects are imparted in accordance with an application of the plurality of applications, the different sound effects are different between the plurality of applications, and the application is a providing source of the agent information acquired by the information acquiring unit; and a presentation control unit that presents, to a user, an application list indicating the sound effects corresponding to each of the plurality of applications.

7 Claims, 12 Drawing Sheets

(56)                     References Cited

U.S. PATENT DOCUMENTS

| | | | |
|---|---|---|---|
| 2017/0047064 A1 | 2/2017 | Kirihara | |
| 2017/0262537 A1* | 9/2017 | Harrison | ................. G10L 15/22 |
| 2019/0018643 A1 | 1/2019 | Li et al. | |
| 2019/0238619 A1* | 8/2019 | Mantrana-Exposito | .................... |
| | | | H04L 63/104 |
| 2020/0133630 A1 | 4/2020 | Kuramochi et al. | |
| 2022/0157300 A1* | 5/2022 | Sharifi | ................... G10L 15/26 |

FOREIGN PATENT DOCUMENTS

| | | | | |
|---|---|---|---|---|
| JP | 2000-305584 | A | | 11/2000 |
| JP | 2004-266472 | A | | 9/2004 |
| JP | 2005-003795 | A | | 1/2005 |
| JP | 2019200486 | A | * | 11/2019 |
| JP | 2019200747 | A | | 11/2019 |
| JP | 2020-067785 | A | | 4/2020 |
| WO | 2009/031208 | A1 | | 3/2009 |
| WO | 2013/069396 | A1 | | 5/2013 |
| WO | 2015/186445 | A1 | | 12/2015 |

OTHER PUBLICATIONS

Machine English translation of CN 105096535 (Year: 2015).*
Patent Cooperation Treaty, International Search Report, Application No. PCT/JP2021/010921, dated Jun. 22, 2021, in 4 pages.
Decision of Refusal received in JP Application No. 2023-506609, dated Apr. 22, 2025, in 7 pages (with translation).
JP Office Action received in JP 2023-506609, dated Nov. 26, 2024, in 11 pages (with translation).

* cited by examiner

| CATEGORY ID | CATEGORY | TIMBRE CHARACTERISTICS (TIMBRE PARAMETER) | ... |
|---|---|---|---|
| CT1 | ATTENTION | MALE VOICE + SLOWLY | ... |
| CT2 | WARNING | MALE VOICE + FAST | ... |
| CT3 | ENTERTAIN-MENT | FEMALE VOICE + FAST | ... |
| CT4 | ADVERTISE-MENT | ROBOT VOICE + SLOWLY | ... |
| CT5 | GUIDANCE | FEMALE VOICE + SLOWLY | ... |
| CT6 | NEWS | ROBOT VOICE + FAST | ... |
| ... | ... | ... | ... |

| PROVIDING DESTINATION USER ID | APP ID | CATEGORY ID | SOUND CONTENTS (TEXT DATA) | ... |
|---|---|---|---|---|
| U1 | AP1 | CT3 | MESSAGE INFORMATION #11 | ... |
| | AP2 | CT4 | MESSAGE INFORMATION #21 | ... |
| | ... | ... | ... | ... |
| U2 | ... | ... | ... | ... |
| ... | ... | ... | ... | ... |

FIG.6

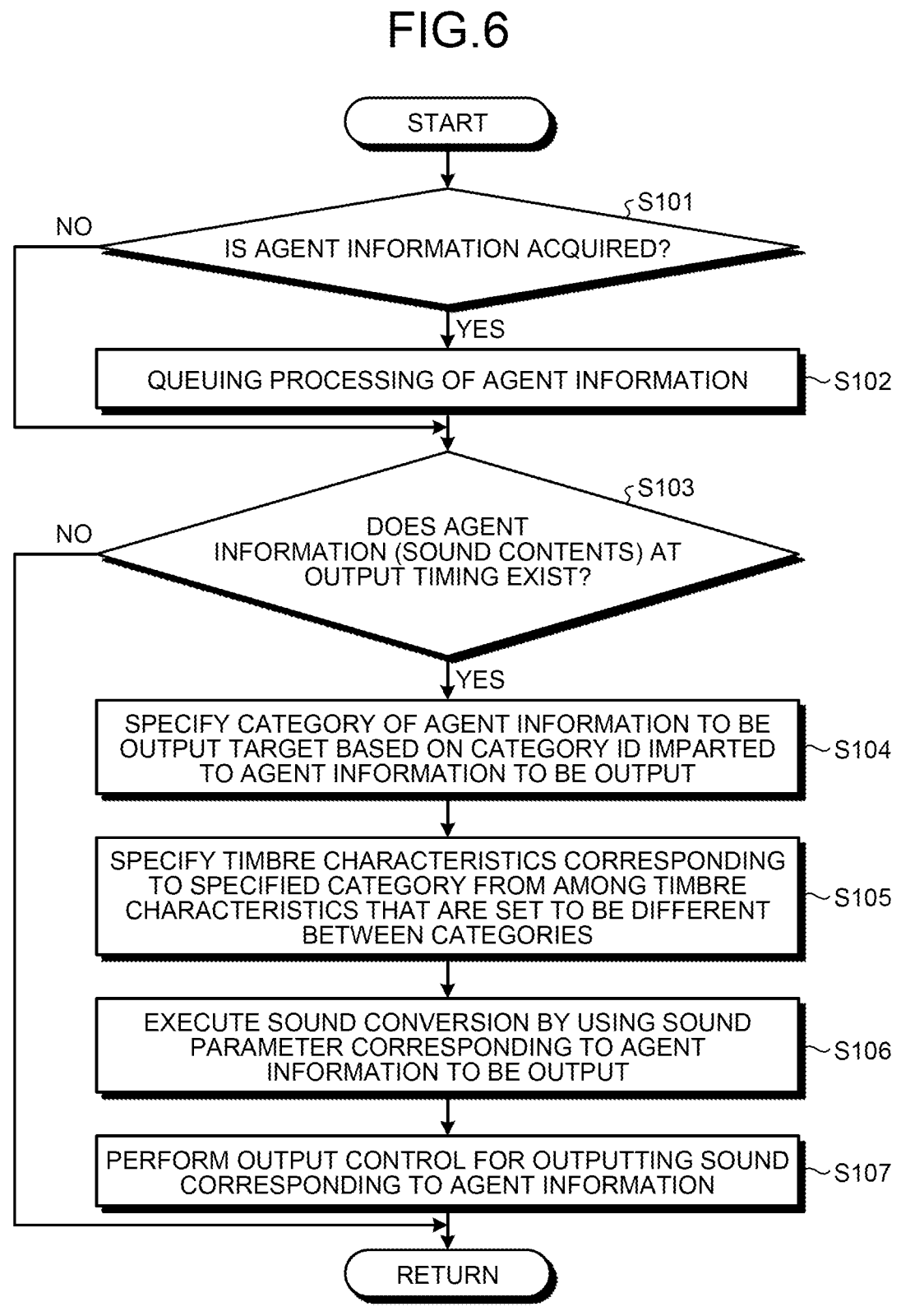

```
                        ( START )
                            │
                            ▼
              NO      ╱───────────────╲  ⟋S101
         ┌───────────   IS AGENT INFORMATION ACQUIRED?
         │            ╲───────────────╱
         │                   │ YES
         │                   ▼
         │   ┌──────────────────────────────────────┐
         │   │ QUEUING PROCESSING OF AGENT INFORMATION │ ∿S102
         │   └──────────────────────────────────────┘
         │                   │
         └──────────────────►│
                             ▼
             NO       ╱──────────────────╲  ⟋S103
        ┌──────────    DOES AGENT
        │             INFORMATION (SOUND CONTENTS) AT
        │              OUTPUT TIMING EXIST?
        │             ╲──────────────────╱
        │                    │ YES
        │                    ▼
        │   ┌──────────────────────────────────────────┐
        │   │ SPECIFY CATEGORY OF AGENT INFORMATION TO BE │
        │   │ OUTPUT TARGET BASED ON CATEGORY ID IMPARTED │ ∿S104
        │   │ TO AGENT INFORMATION TO BE OUTPUT           │
        │   └──────────────────────────────────────────┘
        │                    │
        │                    ▼
        │   ┌──────────────────────────────────────────┐
        │   │ SPECIFY TIMBRE CHARACTERISTICS CORRESPONDING │
        │   │ TO SPECIFIED CATEGORY FROM AMONG TIMBRE     │
        │   │ CHARACTERISTICS THAT ARE SET TO BE DIFFERENT │ ∿S105
        │   │ BETWEEN CATEGORIES                          │
        │   └──────────────────────────────────────────┘
        │                    │
        │                    ▼
        │   ┌──────────────────────────────────────────┐
        │   │ EXECUTE SOUND CONVERSION BY USING SOUND    │
        │   │ PARAMETER CORRESPONDING TO AGENT           │ ∿S106
        │   │ INFORMATION TO BE OUTPUT                    │
        │   └──────────────────────────────────────────┘
        │                    │
        │                    ▼
        │   ┌──────────────────────────────────────────┐
        │   │ PERFORM OUTPUT CONTROL FOR OUTPUTTING SOUND │ ∿S107
        │   │ CORRESPONDING TO AGENT INFORMATION          │
        │   └──────────────────────────────────────────┘
        │                    │
        └───────────────────►│
                             ▼
                       ( RETURN )
```

| APP ID | APP TYPE | SOUND EFFECTS (BACKGROUND SOUND) | ... |
|---|---|---|---|
| AP1 | APP AP1 | SOUND EFFECT #1 | ... |
| AP2 | APP AP2 | SOUND EFFECT #2 | ... |
| AP3 | APP AP3 | SOUND EFFECT #3 | ... |
| AP4 | APP AP4 | MUSIC #4 | ... |
| AP5 | APP AP5 | MUSIC #5 | ... |
| ... | ... | ... | ... |

SOUND OUTPUT CONTROL DEVICE, SOUND OUTPUT CONTROL METHOD, AND SOUND OUTPUT CONTROL PROGRAM

CROSS-REFERENCE TO RELATED APPLICATIONS

This application is national stage application of International Application No. PCT/JP2021/010921, filed on Mar. 17, 2021, which designates the United States, incorporated herein by reference, and which claims the benefit of priority therefrom, the entire contents of which are incorporated herein by reference.

TECHNICAL FIELD

The present disclosure relates to a sound output control device, a sound output control method, and a sound output control program.

BACKGROUND

Conventionally, there has been known such a technology that an agent makes a response with different timbre or tones depending on a type of a task. In addition, there has been known a technology for changing a tone of voice of an agent for each of a plurality of request processing devices.

CITATION LIST

Patent Literature

Patent Document 1: Japanese Unexamined Patent Application Publication No. 8-339288
Patent Document 2: Japanese Unexamined Patent Application Publication No. 2020-067785

SUMMARY OF THE INVENTION

Problem to be Solved by the Invention

However, in the above-mentioned conventional technology, a problem is exemplified in which in a case where, for example, sound contents are provided from respective agents in simultaneously using a plurality of applications each having an agent function; it is difficult for a user, in some cases, to appropriately recognize a providing source of sound contents that are being currently provided and/or a type of the sound contents that are being currently provided. The present disclosure is made in view of the aforementioned, and it is an object of the present disclosure to provide a sound control device, a sound output control method, and a sound output control program capable of assisting a user in appropriately grasping a kind of sound contents that are being currently output, for example.

Solution to Problem

A sound output control device according to claim 1 includes:
an information acquiring unit that acquires agent information provided from each of a plurality of applications having a voice agent function;
a reporting control unit that causes a reporting unit to report a voice message to which different sound effects are imparted in accordance with an application of the plurality of applications, the different sound effects being different between the plurality of applications, and the application being a providing source of the agent information acquired by the information acquiring unit; and
a presentation control unit that presents, to a user, an application list indicating the sound effects corresponding to each of the plurality of applications.

In addition, the sound output control method according to an exemplary aspect is a sound output control method executed by a sound output control device, the sound output control method including:
acquiring agent information provided from each of a plurality of applications having a voice agent function;
causing a reporting unit to report a voice message to which different sound effects are imparted in accordance with an application of the plurality of applications, the different sound effects being different between the plurality of applications, and the application being a providing source of the agent information acquired in the acquiring; and
presenting, to a user, an application list indicating sound effects corresponding to each of the plurality of applications.

Further, the sound output control program according to another exemplary aspect is a sound output control program executed by a sound output control device including a computer, the sound output control program causing the computer to function as:
an information acquiring means for acquiring agent information provided from each of a plurality of applications having a voice agent function;
a reporting control means for causing a reporting unit to report a voice message to which different sound effects are imparted in accordance with an application of the plurality of applications, the different sound effects being different between the plurality of applications, and the application being a providing source of the agent information acquired by the information acquiring means; and
a presentation control means for presenting, to a user, an application list indicating sound effects corresponding to each of the plurality of applications.

BRIEF DESCRIPTION OF DRAWINGS

FIG. 3 is a diagram illustrating an example of a category group database according to the first embodiment.
FIG. 4 is a diagram illustrating an example of a content buffer according to the first embodiment.
FIG. 6 is a flowchart illustrating an information processing procedure according to the first embodiment.
FIG. 8 is a diagram illustrating an example of an application type database according to the second embodiment.

DESCRIPTION OF EMBODIMENTS

Figure 1:
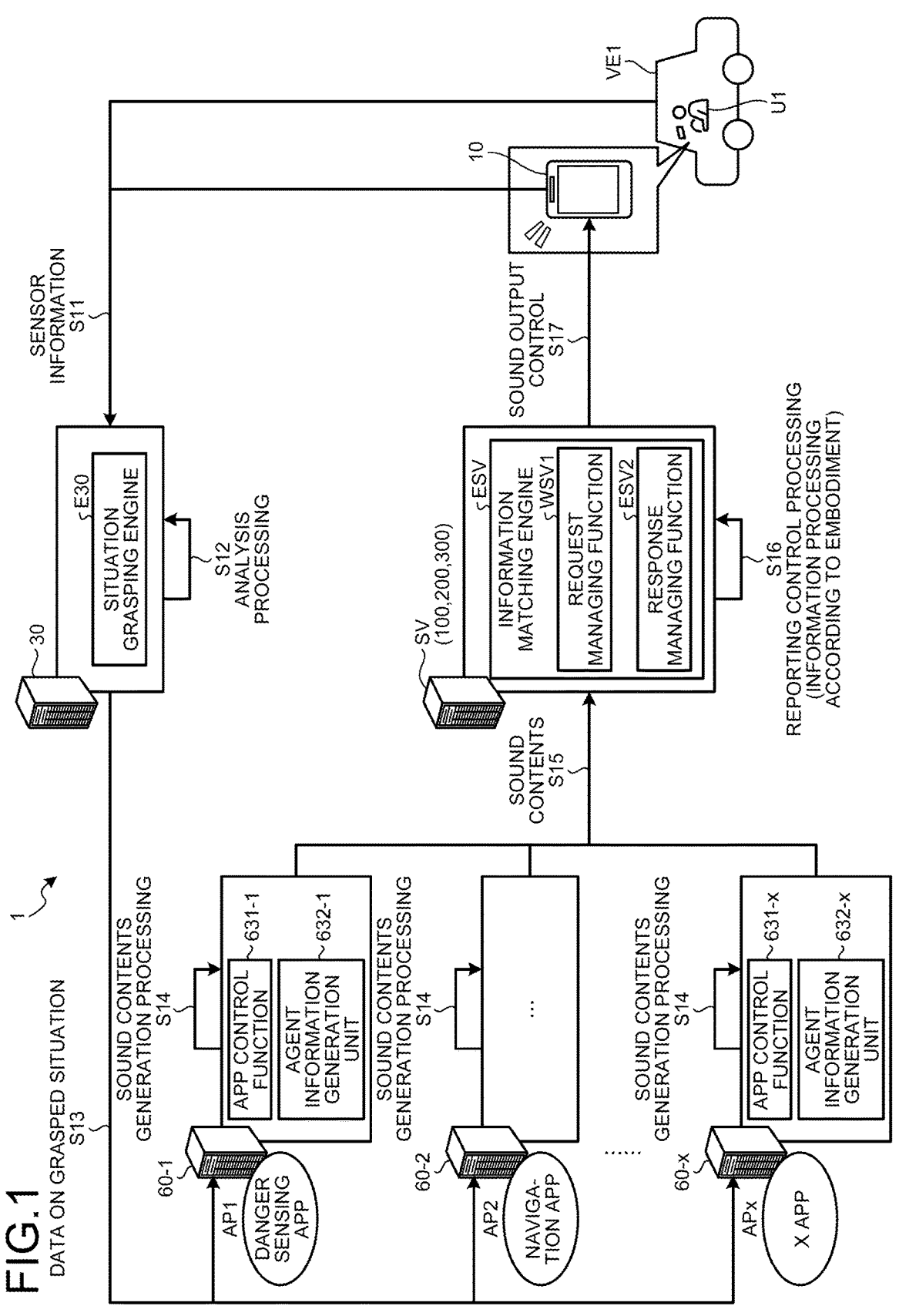
FIG. 1 is a diagram illustrating an entire image of information processing according to embodiments.

Hereinafter, modes (hereinafter, may be referred to as embodiments) to implement the present disclosure will be explained with reference to the accompanying drawings. The embodiments explained below are not intended to limit the present invention. Further, in description of the drawings, the same reference signs are assigned to identical parts.

SUMMARY OF EMBODIMENTS

1. Introduction

There has been known an application (hereinafter abbreviated as "app") that provides various contents through a terminal device (namely, navigation terminal) provided in a vehicle or a terminal device such as a smartphone, which is owned by a user (for example, passenger of vehicle). There exists an app that is provided with an agent function to assist the user so as to assist driving in accordance with a traveling state of a vehicle or a situation of a user that is driving a vehicle, and/or assist with route guidance in accordance with various inputs (for example, text input or voice input). In addition, there also exists an app that provides various contents such as sightseeing guidance, shop guidance, other useful information in accordance with travelling of a vehicle so as to assist with more pleasant driving.

In addition, many of the apps try to assist a user with the use of sound contents produced by a voice agent function in terms of a safety aspect taking into consideration that a user of an output destination is a passenger of a vehicle. In such a case, for example, a plurality of apps will be linked regarding a user in a vehicle and the sound contents having various categories will be provided thereto, and thus a problem described below may occur.

For example, an example of a first problem is that, when the sound contents of various categories are output, it becomes difficult for the user to grasp whether or not the sound contents currently being output are sound contents of a desired category in a case where the user is waiting for the sound contents of the desired category to be output.

Further, an example of a second problem is that, when the sound contents of various app types are output, it becomes difficult for the user to grasp whether or not the sound contents currently being output are sound contents of a desired type in a case where, for example, the user is waiting for output of sound contents that are provided by a specific app of a plurality of apps.

Further, an example of a third problem is that, in a case where the plurality of apps are utilized, it becomes difficult for the user to specify an app that fits a taste of him/herself since it is difficult to distinguish which app is a providing source of the sound contents.

Then, it is an object of the present disclosure to provide a sound control device, a data structure, a sound output control method, and a sound output control program capable of solving the problems described above. Hereinafter, as information processing implemented by the sound control device, the data structure, the sound output control method, and the sound output control program which correspond to the present invention, three pieces of information processing (first information processing, second information processing, and third information processing) will be explained in detail. Specifically, the first information processing is explained as information processing according to a first embodiment, and the second information processing is explained as information processing according to a second embodiment. In addition, the third information processing is explained as information processing according to a third embodiment.

2. Entire Image of Information Processing According to Embodiments

Prior to an explanation of each embodiment, an entire image of information processing according to embodiments is explained with reference to FIG. 1. FIG. 1 is a diagram illustrating the entire image of the information processing according to the embodiments. An information processing system 1 illustrated in FIG. 1 (one example of information processing system according to embodiment) is common to the first embodiment, the second embodiment, and the third embodiment. Further, in an explanation that follows, in a case where there is no need to distinguish the first embodiment, the second embodiment, and the third embodiment, it may be simply expressed as "embodiment".

According to the example illustrated in FIG. 1, the information processing system 1 according to the embodiment includes a terminal device 10, a situation grasping device 30, an agent device 60-x, and a sound output control device 100. Further, these devices included in the information processing system 1 are communicably connected in a wired or wireless manner through a network.

(Terminal Device)

The terminal device 10 is an information processing terminal to be used by a user. The terminal device 10 may be, for example, a stationary navigation device mounted in a vehicle, or a portable terminal device owned by a user (for example, smartphone, tablet-type terminal, laptop PC, desktop PC, PDA, or the like). In the present embodiment, the terminal device 10 is defined as a navigation device that is mounted in a vehicle.

In addition, in the example illustrated in FIG. 1, assume that a plurality of apps is linked to the terminal device 10. For example, a plurality of apps may be installed by a user so as to link the plurality of apps to the terminal device 10, or the information processing system 1 may include an app that is capable of reporting various contents by using a push notification regardless of presence or absence of installation of the app so as to link the plurality of apps to the terminal device 10.

Further, the terminal device 10 further includes a reporting unit (output unit) so as to output sound contents that are provided from the reporting unit by each app. Thus, the reporting unit may be, for example, a speaker. Further, the user referred to here may be a passenger (for example, driver) of a vehicle in which the terminal device 10 is installed. That is, in the example illustrated in FIG. 1, an example is indicated in which the terminal device 10 is installed in a vehicle VET and a user of the terminal device 10 is a user U1 who is driving the vehicle VET.

(Agent Device)

The agent device 60-x may exist by an app linked to the terminal device 10, and may be an information processing device implementing a function or a role of the app. In FIG.

1, a case is exemplified in which the agent device 60-*x* is a server device however, the agent device 60-*x* may be implemented by the cloud system.

In addition, the app linked to the terminal device 10 may be an application that assists the user by using the sound contents, and the agent device 60-*x* has a voice agent function corresponding to this assisting function. In addition, from what is described above, the app linked to the terminal device 10 can be called a so-called voice agent app.

Further, in the embodiment below, in a case of expressing the agent device 60-*x* corresponding to an app APx and a processing unit included in the agent device 60-*x* (for example, app control function 631-*x* and agent information generating unit 632-*x*) while distinguishing therebetween, an arbitrary value is used with respect to "x".

For example, in FIG. 1, an agent device 60-1 is illustrated as an example of the agent device 60-*x*. The agent device 60-1 is an agent device that corresponds to an app AP1 (danger sensing app) so as to sense a danger in driving, and provides the user with sound contents indicating a caution or warning. Further, according to the example illustrated in FIG. 1, the agent device 60-*x* includes an app control function 631-1 and an agent information generating unit 632-1.

In addition, in FIG. 1, an agent device 60-2 is illustrated as another example of the agent device 60-*x*. The agent device 60-2 is an agent device that corresponds to an app AP2 (navigation app) so as to provide the user with sound contents regarding route guidance. It is not illustrated in FIG. 1, however, the agent device 60-2 may include an app control function 631-2 and an agent information generating unit 632-2.

The app linked to the terminal device 10 is not limited to the examples described above; however, the app linked to the terminal device 10 may be, as other examples, apps that provide sound contents regarding sightseeing guidance, sound contents regarding shop guidance, and/or various kinds of useful information, for example. Further, an expression of "an app provides" includes a concept of" the agent device 60-*x* that corresponds to the app provides".

Next, a function of the agent device 60-*x* will be explained. According to the example illustrated in FIG. 1, the agent device 60-*x* includes the app control function 631-*x* and the agent information generating unit 632-*x*.

The app control function 631-*x* executes various controls regarding the app APx. For example, the app control function 631-*x* executes personalization of a content that is provided per a user on the basis of a history of usage by the user. Further, the app control function 631-*x* executes processing for determining a kind of content of a voice message for response on the basis of a content of utterance indicated by voice that is input by a user, in order to implement a conversation with the user. In addition, the app control function 631-*x* can also determine a content to be provided to the user or a content of a voice message to respond the user on the basis of a situation of the user.

The agent information generating unit 632-*x* executes generation processing for generating sound contents (one example of agent information). For example, the agent information generating unit 632-*x* decides a category of sound contents to be output, and further generates sound contents having a content which belongs to the decided category. For example, the agent information generating unit 632-*x* generates message information on a content corresponding to a traveling state of a vehicle or a situation of a user that is driving the vehicle, which is grasped by the situation grasping device 30. The message information is, for example, text data that is a base of the sound contents to be eventually reported to the user U1, and further defines a content of voice that is acquired later after conversion into sound data. That is, not limited to generating sound data as sound contents, the agent information generating unit 632-*x* may generate data, as the sound contents, in another format that is a base of the voice message. Further, the agent information generating unit 632-*x* decides category identification information (category ID) that identifies a category of message information on the basis of a content indicated by the generated message information. In other words, the category of message information is a category of sound contents including the message information.

Further, the agent information generating unit 632-*x* imparts app identification information (app ID) that identifies the app APx corresponding to the agent device 60-*x* to the sound contents.

When the agent device 60-1 is described as an example, the agent information generating unit 632-1 imparts an app ID (for example, "APT") that identifies the app APT corresponding to the agent device 60-1 to sound contents. In addition, in a case where the generated sound contents belong to a category "entertainment", the agent information generating unit 632-1 imparts a category ID indicating the category "entertainment" to sound contents. That is, the agent information generating unit 632-1 imparts, to the generated message information, the app ID for identifying a generation source of the message information and the category ID for identifying a content of the message information, so as to generate agent information as sound contents. In other words, the agent information as the sound contents generated by the agent information generating unit 632-1 is imparted with the app identification information for identifying an application of a providing source having provided the agent information and the category identification information for identifying a category of the agent information.

Further, not limited to the example above, in a case where an input with the use of voice is performed by utterance of a user through the terminal device 10, for example, the agent information generating unit 632-*x* may generate message information having a content responding to the input voice. Thus, the agent device 60-*x* is capable of generating sound contents that realizes conversation with the user.

In addition, the agent information generating unit 632-*x* is further capable of designating a timing at which the sound contents are output. For example, the agent information generating unit 632-*x* is capable of generating allowable range information that designates a temporal range or a geographical range to allow an output of sound contents, by using a time range, a traveling distance range of the vehicle, a passing area of the vehicle, speed of the vehicle, or the like. Further, in such a case, the agent information generating unit 632-*x* requests (namely, makes a reservation with) a sound output control device SV to cause the terminal device 10 of the vehicle to output the sound contents that matches a condition indicated by the allowable range information by transmitting the sound contents and the allowable range information to the sound output control device SV. A designation of the timing or the request may be performed by a processing unit other than the agent information generating unit 632-*x*.

(Situation Grasping Device)

The situation grasping device 30 executes analysis processing for grasping a traveling state of a vehicle or a situation of a user that is driving the vehicle. In FIG. 1, an example that the situation grasping device 30 is a server device is illustrated; however, the analysis processing may be implemented by, for example, the cloud system. Further, according to the example illustrated in FIG. 1, the analysis processing is executed by a situation grasping engine E30 mounted in the situation grasping device 30. For example, the situation grasping engine E30 performs sensing of a traveling state or a user situation on the basis of sensor information acquired from various sensors. The sensor here may be, for example, a sensor provided in the vehicle or a sensor included in the terminal device 10, and an example of the sensor is an acceleration sensor, a gyro sensor, a magnetic sensor, a GPS, a camera, a microphone, or the like.

For example, the situation grasping engine E30 can perform a series of pieces of analysis processing described below. For example, the situation grasping engine E30 performs the sensing based on the sensor information acquired from the sensor described above, and further performs a base analysis by using a sensing result as a core element. In the base analysis, the situation grasping engine E30 extracts necessary data having the core element as an information source, and performs a conversion and processing of the extracted data. Next, the situation grasping engine E30 performs a high-order analysis by using data after a conversion or the processing. In the high-order analysis, the situation grasping engine E30 performs analysis of a specific situation based on the data after the conversion or the processing. For example, the situation grasping engine E30 performs grasping of various situations such as a situation of an impact added to a vehicle, a situation of vehicle lighting, a change of the traveling state, and a situation of the user him/herself, or the like from the data after the conversion or the processing. In addition, the situation grasping engine E30 can also perform action prediction of the user (for example, prediction of a place to stop-off) as the situation grasping of a situation.

(Sound Output Control Device)

The sound output control device SV executes information processing according to the embodiments. Specifically, the sound output control device SV executes information processing according to the first embodiment (first information processing), information processing according to the second embodiment (second information processing), and information processing according to the third embodiment (third information processing), which will be mentioned later as the information processing according to the embodiments. Further, the information processing according to the embodiments is processing regarding reporting control to cause the reporting unit included in the terminal device 10 to output a voice message. In FIG. 1, an example is illustrated in which the sound output control device SV is a server device; however, the information processing may be implemented by the cloud system, for example.

Further, as illustrated in FIG. 1, each information processing according to the embodiments is executed by an information matching engine ESV mounted in the sound output control device SV. As illustrated in FIG. 1, functions such as a request managing function ESV1 and a response managing function ESV2 are included in the information matching engine ESV.

The request managing function ESV1 receives a request from the agent device 60-*x* and further executes a queuing corresponding to the received request. The request here may be an output request that demands an output of the generated sound contents toward a user, and is transmitted in a state in which the request includes the sound contents, for example. Further, the request managing function ESV1 executes the queuing on the received sound contents in a content buffer 122 (see FIG. 4).

On the basis of data (for example, data indicating result of analysis processing) regarding a situation, which is grasped by the situation grasping device 30, and/or allowable range information included in the request; the response managing function ESV2 determines a priority that indicates the output order for actually outputting sound contents that are reserved to be output. Then, the response managing function ESV2 performs an output control over the terminal device 10 so as to output each of the sound contents in the order of the decided priority. The output control performed on the terminal device 10 includes a concept of output control over the reporting unit included in the terminal device 10.

3. Flow of Information Processing According to Embodiments

So far, each device included in the information processing system 1 is focused and explained. Next, an overall flow of the information processing according to the embodiments will be explained. Here, there assumed a scene in which sound contents are output through the terminal device 10 mounted in the vehicle VET to the user U1 who is driving the vehicle VET.

In the above-mentioned scene, the terminal device 10 constantly transmits sensor information detected by a sensor included in an own device to the situation grasping device 30 (Step S11).

In a case where acquiring the sensor information transmitted from the terminal device 10, the situation grasping engine E30 of the situation grasping device 30 executes analysis processing for grasping various situations such as a traveling state of the vehicle VET and a situation of the user U1 that is driving the vehicle VET (Step S12). For example, the situation grasping engine E30 executes a series of pieces of analysis processing such as sensing using the sensor information, base analysis using sensing result as core elements, and a high-order analysis using data acquired from result of the base analysis, so as to grasp detailed situation.

Further, in a case where the analysis processing is completed, the situation grasping device 30 transmits data (for example, data indicating result of analysis processing) regarding a situation grasped by the situation grasping engine E30 to the agent device 60-*x* (Step S13). In the example illustrated in FIG. 1, the situation grasping device 30 transmits data regarding the situation to each of the agent devices 60-*x* such as the agent device 60-1 and the agent device 60-2.

When acquiring data regarding the situation from the situation grasping device 30, the agent information generating unit 632-*x* of the agent device 60-*x* executes generation processing so as to generate sound contents of an output target on the basis of the acquired data (Step S14). For example, on the basis of the acquired data, the agent information generating unit 632-*x* decides a category of sound contents to be output, and further generates sound contents having a content that belongs to the decided category. For example, the agent information generating unit 632-*x* generates message information (text data) having a content corresponding to a situation indicated by the acquired data.

Further, the agent information generating unit 632-*x* transmits the generated sound contents to the sound output control device SV in a state in which the generated sound contents are imparted with a category ID that identifies a category to which sound contents belong (category to which message information belongs), and an app ID that identifies the app APx corresponding to the own device.

In the example illustrated in FIG. 1, an example is indicated in which the generation processing of the Step S14 is executed by each of the agent devices 60-*x* such as the agent device 60-1 and the agent device 60-2 so that each of the agent devices 60-*x* transmits corresponding own sound contents to the sound output control device SV in Step S15.

Next, in a case where acquiring sound contents to be output, the information matching engine ESV of the sound output control device SV executes reporting control processing on the sound contents to be output (Step S16). For example, in a case where converting message information included in sound contents to be output into sound data (namely, voice message), the information matching engine ESV executes the conversion while changing a mode of sound in accordance with a category of the sound contents to be output, and further performs reporting control so as to report converted sound data. Further, for example, the information matching engine ESV performs reporting control such that in a state in which a sound effect (for example, background sound) according to a type of an app, which indicates what kind of app the sound contents to be output belong to, is imparted to the converted sound data (for example, voice message). Details regarding such reporting control processing will be explained later in a first embodiment and a second embodiment to be mentioned.

Lastly, the sound output control device SV performs sound output control over the terminal device 10 in accordance with the reporting control executed by the information matching engine ESV (Step S17). Specifically, the sound output control device SV controls the terminal device 10 such that sound data that is reporting-controlled by the information matching engine ESV is output from the reporting unit of the terminal device 10.

First Embodiment

1. Summary of First Embodiment

From here, the first embodiment will be explained. Information processing according to the first embodiment (that is, first information processing) is executed for the purpose of solving the first problem described above. Specifically, the first information processing is executed by the sound output control device 100 corresponding to a sound output control device SV illustrated in FIG. 1. The sound output control device 100 executes the first information processing in accordance with a sound output control program according to the first embodiment. In addition, the sound output control device 100 has a configuration constituted of a category group database 121 (see FIG. 3) and a content buffer 122 (see FIG. 4).

Figure 2:
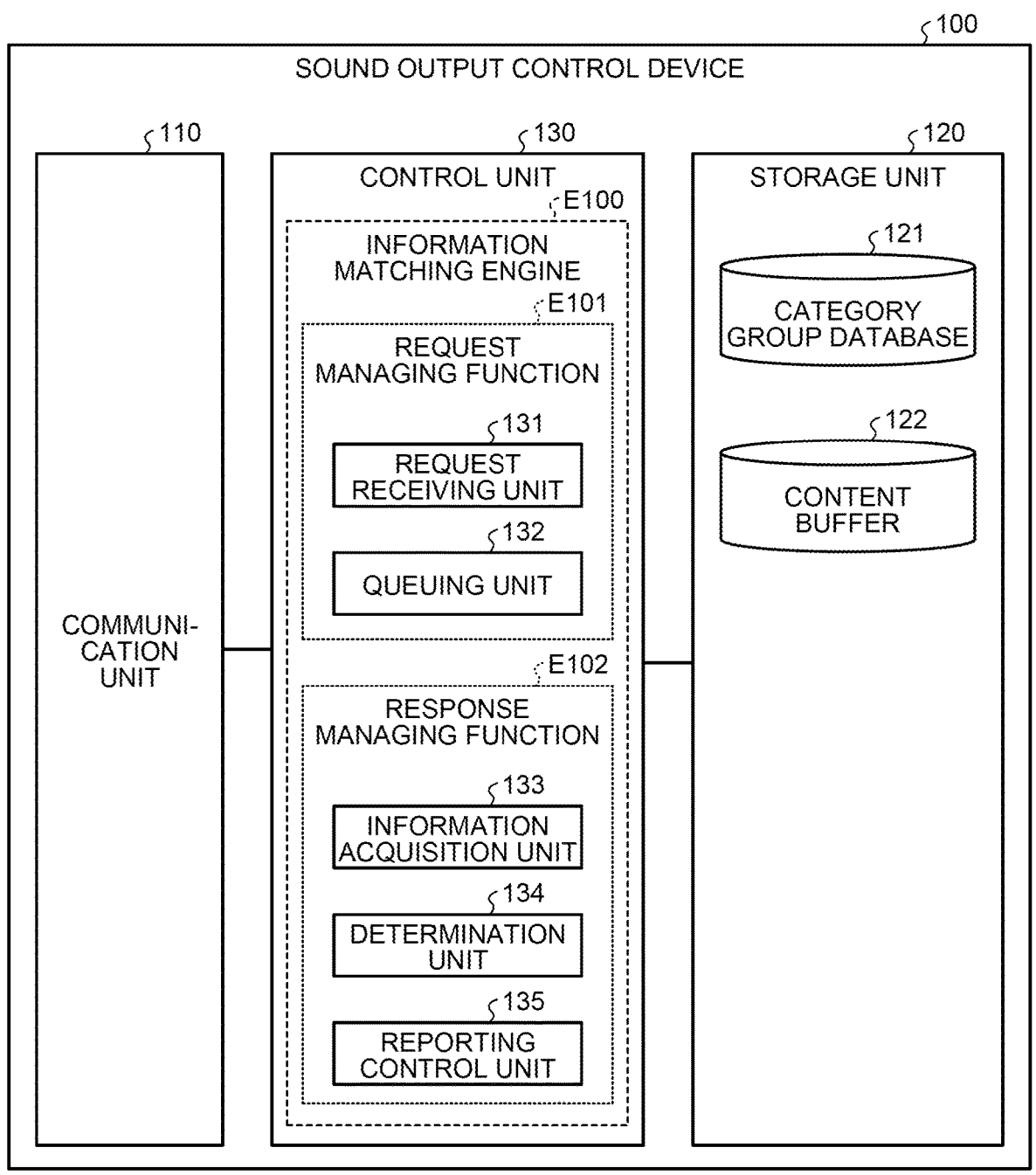
FIG. 2 is a diagram illustrating a configuration example of a sound output control device according to a first embodiment.

2. Configuration of Sound Output Control Device According to First Embodiment Next, the sound output control device 100 according to the first embodiment will be explained with reference to FIG. 2. FIG. 2 is a diagram illustrating a configuration example of the sound output control device 100 according to the first embodiment. As illustrated in FIG. 2, the sound output control device 100 includes a communication unit 110, a storage unit 120, and a control unit 130.
(Communication Unit 110)

The communication unit 110 is implemented by, for example, a network card (NIC) or the like. Next, the communication unit 110 is connected to a network in a wired or wireless manner so as to transmit/receive information to/from the communication unit 110, the terminal device 10, the situation grasping device 30, and the agent device 60-*x*, for example.
(Storage Unit 120)

The storage unit 120 is implemented by a semiconductor memory element such as a Random Access Memory (RAM) and a flash memory, or a storage device such as a hard disk and an optical disk. The storage unit 120 includes the category group database 121 and the content buffer 122.
(Category Group Database 121)

The category group database 121 stores therein information regarding a category to which sound contents (agent information) provided by an app APx belong. Here, an example of the category group database 121 according to the first embodiment is illustrated in FIG. 3. In the example illustrated in FIG. 3, the category group database 121 includes items such as "category ID", "category", and "timbre characteristics".

The "category ID" indicates a candidate used to specify to which category sound contents to be output provided by the app APx side belong.

The "category" is a "category" of a candidate to be used for specifying which category sound contents to be output provided by an app side belong to. In the example illustrated in FIG. 3, the "category" of the candidate includes "attention", "warning", "entertainment", "advertisement", "guidance", or "news", and the like. Even when apps of a providing source that provide the sound contents to be output are different, there exists a situation in which the sound contents to be output themselves belong to the same category. For one example, even in a case where different apps such as an app AP1 and an app AP5 individually provide sound contents to be output, the provided sound contents to be output belong to the category "entertainment" in some cases.

"Timbre characteristics" indicates a timbre parameter of a candidate that is used in reporting control processing for changing timbre of a sound when outputting a sound according to sound contents from the reporting unit of the terminal device 10 in accordance with a category of the sound contents to be output.

In the example illustrated in FIG. 3, timbre characteristics "male voice+slowly" is associated with the category "attention" identified by a category ID "CT1". The above-mentioned example indicates an example in which in a case where the sound contents to be output have the category "attention", it is defined to change a voice message output from the reporting unit of the terminal device 10 to a timbre having characteristics of "male voice+slowly". Therefore, a timbre parameter in the above-mentioned example corresponds to a parameter indicating the "male voice+slowly".

In addition, in the example illustrated in FIG. 3, timbre characteristics "female voice+fast" is associated with the category "entertainment" identified by a category ID "CT3". The example indicates an example in which in a case where sound contents to be output belong to the category "entertainment", it is defined to change a voice message output from the reporting unit of the terminal device 10 to a timbre having characteristics of "female voice+fast". Therefore, a timbre parameter in the above-mentioned example corresponds to a parameter indicating the "female voice+fast".
(Content Buffer 122)

The content buffer 122 functions as a storage region to execute queuing on information regarding sound contents transmitted from the agent device 60-*x*. Here, an example of data stored in the content buffer 122 according to the first embodiment is illustrated in FIG. 4. In the example illustrated in FIG. 4, the content buffer 122 includes items such as "providing destination ID", "app ID", "category ID", and "sound contents".

The "providing destination ID" indicates identification information to identify a user of an output destination (or terminal device 10 of the user) to whom "sound contents" are output (reported). "App ID" indicates identification information to identify an application of a providing source (or agent device 60-*x* corresponding to the application) that provides "sound contents" to be output. In other words, the application of the providing source is an application of a generation source that generates the "sound contents" to be output.

The "category ID" indicates identification information to identify a category to which the "sound contents" to be output provided by the application identified by the "app ID" belong. The "category ID" is imparted to "sound contents" to be output, by the agent device 60-*x* corresponding to the application identified by "app ID".

The "sound contents" is information regarding the "sound contents" to be output provided by the application identified by the "app ID". The "sound contents" includes text data as message information, for example.

That is, in the example illustrated in FIG. 4, an example is indicated that a content of message information #11 provided by the application (app AP1) identified by the app ID "AP1" belongs to a category identified by the category ID "CT3", and that the content is output to an user (user U1) identified by a user ID "U1".

(Control Unit 130)

Returning to FIG. 2, the control unit 130 is implemented by executing various programs (for example, sound output control program) stored in a storage device inside the sound output control device 100 having the RAM as a working area by a Central Processing Unit (CPU) or a Micro Processing Unit (MPU) or the like. Further, the control unit 130 is implemented by an integrated circuit such as an Application Specific Integrated Circuit (ASIC) and a Field Programmable Gate Array (FPGA).

As illustrated in FIG. 2, a situation grasping engine E100 is mounted in the control unit 130. The situation grasping engine E100 corresponds to the information matching engine ESV explained with reference to FIG. 1. In the situation grasping engine E100 includes a request managing function E101 (corresponding to request managing function ESV1 explained with reference to FIG. 1) and a response managing function E102 (corresponding to response managing function ESV2 explained with reference FIG. 1).

Further, as illustrated in FIG. 2, the request managing function E101 includes a request receiving unit 131 and a queuing unit 132. In addition, the response managing function E102 includes an information acquiring unit 133, a determination unit 134, and a reporting control unit 135.

(Request Receiving Unit 131)

The request receiving unit 131 receives a request from the agent device 60-*x*. Specifically, the request receiving unit 131 receives a request of demanding an output of sound contents to be output to the user from the agent device 60-*x*. In addition, the above-mentioned request may include sound contents to be output, a user ID to identify a user of a providing destination, an allowable range information that conditions a time period and/or a timing to allow an output of sound contents, or the like.

(Queuing Unit 132)

The queuing unit 132 performs queuing on sound contents to be output in accordance with a request received by the request receiving unit 131. For example, the queuing unit 132 executes queuing on sound contents associated with the request in the content buffer 122.

(Information Acquiring Unit 133)

The information acquiring unit 133 acquires, as information provided to a user, sound contents to be output (agent information) from the agent devices 60-*x* capable of outputting respective sound contents (agent information) that belong to different categories. Specifically, the information acquiring unit 133 acquires sound contents that belong to respective different categories from the agent devices 60-*x* each of which is capable of outputting agent information provided from a corresponding application and corresponds to an agent function included in the application, and further delivers the sound contents to the queuing unit 132.

(Determination Unit 134)

The determination unit 134 determines a priority to decide in what order sound contents that are reserved to be output should actually be output on the basis of the allowable range information included in a request received by the request receiving unit 131, and further reads the sound contents from the content buffer 122, which reach the output timing.

(Reporting Control Unit 135)

The reporting control unit 135 converts, into sound data, message information included in sound contents (agent information) transmitted from the agent device 60-*x*. For example, with respect to the sound contents that are determined to be output from the determination unit 134, the reporting control unit 135 performs sound synthesis on the basis of text data by using a technique of Text to Speech (TTS) so as to convert the message information into sound data. Next, the reporting control unit 135 causes the reporting unit of the terminal device 10 to output the sound data (voice message) obtained by converting the message information.

Further, the reporting control unit 135 changes a mode of the voice message in accordance with a category of sound contents to be output, and further causes the reporting unit to report the voice message. For example, regardless of which application of the plurality of applications sound contents to be output are provided from, the reporting control unit 135 changes a timbre parameter of sound synthesis in accordance with a category to which the sound contents to be output belong so as to change an mode of the sound data to be converted.

Further, as described above, category identification information (category ID) for identifying a category of the sound content is imparted to each of the sound contents acquired from the agent device 60-*x*. Therefore, the reporting control unit 135 changes a mode of a voice message in accordance with a category indicated by the category identification information imparted to the sound contents to be output.

For example, the reporting control unit 135 causes the timbre of the voice message to change in accordance with a category of a plurality of different categories of the sound contents to be output.

Further, the reporting control unit 135 may cause the reporting unit to report sound data while adding thereto sound effects according to a category of sound contents to be output from among a plurality of different categories. The sound effects here indicate a sound effect imparted to a beginning, an end, or the like of a voice message, or a background sound such as background music (BGM) to be overlapped with the voice message.

On the other hand, sound effects having different modes may be set among a plurality of applications. In such a case, the reporting control unit 135 may cause the reporting unit to report a voice message while adding thereto sound effects according to an application of a providing source that provides sound contents to be output having sound effects that are different from among the plurality of applications. Specifically, app identification information (app ID) identifying an application of a providing source that provides sound contents is imparted to each of sound contents acquired from the agent device 60-x. Therefore, the reporting control unit 135 causes the reporting unit to report a voice message while adding thereto sound effects according to an application indicated by the app identification information imparted to the sound contents to be output from among of the plurality of applications. This point will be explained in detail in the second embodiment.

3. Specific Example of Sound Output Control Method

Figure 5:
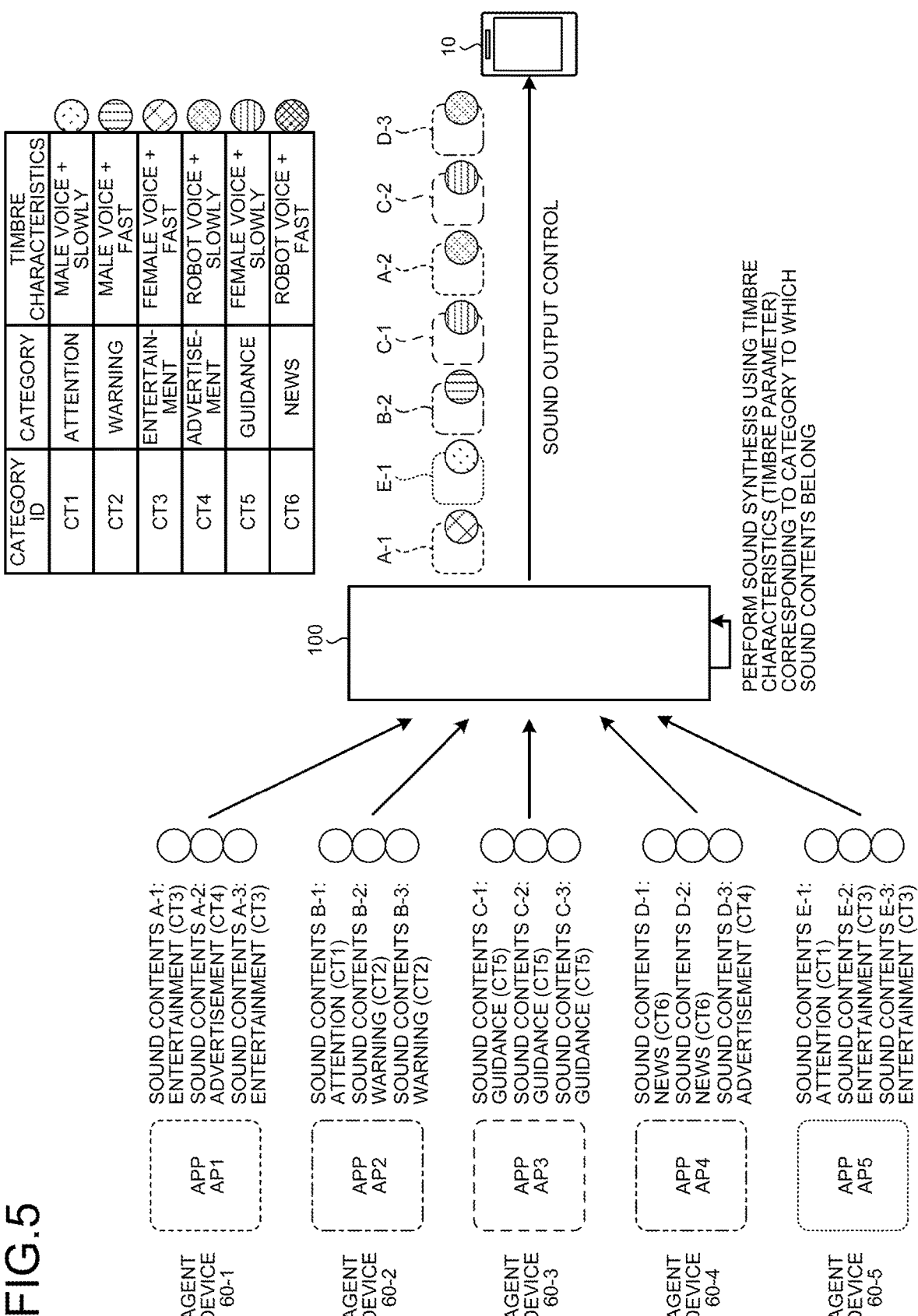
FIG. 5 is a diagram illustrating an example of a sound output control method according to the first embodiment.

Next, a specific example of a sound output control method performed in the first information processing will be explained with reference to FIG. 5. FIG. 5 is a diagram illustrating an example of a sound output control method according to the first embodiment.

In FIG. 5, five applications such as the app AP1, an app AP2, an app AP3, an app AP4, and the app AP5 (apps AP1 to AP5) are indicated as a plurality of apps. Further, as the agent devices 60-x capable of causing the reporting unit to output the sound contents provided from each of the apps AP1 to AP5, the agent device 60-1, the agent device 60-2, the agent device 60-3, the agent device 60-4, and the agent device 60-5 are indicated in FIG. 5. Specifically, in the example illustrated in FIG. 5, the agent device 60-1 is an agent device capable of causing sound contents corresponding to the app AP1 to be output such that the sound contents are provided to the user. Further, the agent device 60-2 is an agent device capable of causing sound contents corresponding to the app AP2 to be output such that the sound contents are provided to the user. In addition, the agent device 60-3 is an agent device capable of causing sound contents corresponding to the app AP3 to be output such that the sound contents are provided to the user. Further, the agent device 60-4 is an agent device capable of causing sound contents corresponding to the app AP4 to be output such that the sound contents are provided to the user. In addition, the agent device 60-5 is an agent device capable of causing sound contents corresponding to the app AP5 to be output such that the sound contents are provided to the user.

Further, according to the example illustrated in FIG. 5, the agent device 60-1 is a device capable of causing sound contents having the category "entertainment" to be output and sound contents having the category "advertisement" to be output. Further, the agent device 60-2 is a device capable of causing sound contents having the category "attention" to be output and sound contents having the category "warning" to be output. In addition, the agent device 60-3 is a device capable of causing sound contents having the category "guidance" to be output. Further, the agent device 60-4 is a device capable of causing the sound contents having the category "news" to be output and sound contents having the category "advertisement" to be output. In addition, the agent device 60-5 is a device capable of causing sound contents having the category "attention" to be output and sound contents having the category "entertainment" to be output.

Here, for example, assume that the agent information generating unit 632-1 of the agent device 60-1 generates sound contents A-1 that are corresponding to message information on contents having the category "entertainment" on the basis of data regarding a situation acquired from the situation grasping device 30. In such a case, the agent device 60-1 transmits the sound contents A-1 to the sound output control device 100 in a state in which the category ID "CT3" identifying the category "entertainment" is imparted thereto as illustrated in FIG. 5 such that the sound contents A-1 is output to the user U1. In addition, in this time, the agent device 60-1 may further impart thereto the app ID "AP1" for identifying the app AP1 that is an application of a providing source providing the sound contents A-1.

The information acquiring unit 133 of the sound output control device 100 acquires from the agent device 60-1, as sound contents to be output, the sound contents A-1 to which the category ID "CT3" is imparted. Next, in a case where the sound contents A-1 is determined as sound contents to be output from the reporting unit of the terminal device 10 in processing executed by the queuing unit 132 and the determination unit 134, the reporting control unit 135 executes reporting control processing such as performing the sound synthesis with respect to message information included in the sound contents A-1 of a determined output target by using a timbre parameter according to a category of the sound contents A-1.

According to the example illustrated in FIG. 5, the reporting control unit 135 compares the category ID "CT3" imparted to the sound contents A-1 with the category group database 121 to be capable of specifying that a category of the sound contents A-1 is the "entertainment". In addition, the reporting control unit 135 recognizes that a voice message to be output from the reporting unit of the terminal device 10 is decided to have a timbre of the characteristics of "female voice+fast" with reference to the category group database 121. Next, the reporting control unit 135 performs sound synthesis by using the parameter indicating the "female voice+fast" with respect to the sound data included in the sound contents A-1 so as to change a timbre of the sound.

Next, the reporting control unit 135 performs sound output control such that the voice message after the sound synthesis of the sound contents A-1 is reported from the reporting unit of the terminal device 10 of the user U1. For example, the reporting control unit 135 transmits a voice message after the sound synthesis of the sound contents A-1 to the terminal device 10 of the user U1 so as to execute control for outputting the voice message corresponding to the sound contents A-1. The terminal device 10 reports a voice message from the reporting unit in accordance with the sound output control executed from the reporting control unit 135. Thus, the user U1 is able to easily grasp that sound contents currently being output has the category "entertainment".

The reporting control unit 135 may not only change the timbre of the voice message corresponding to the sound contents A-1 corresponding to a fact that the sound contents A-1 have the category "entertainment", but impart the sound effect corresponding to the fact that the sound contents A-1 have the category "entertainment" (for example, sound effect, background sound such as BGM or the like) to the voice message. In such a case, for example, in the category group database 121 illustrated in FIG. 3, data of the sound effect according to the category indicated by the category ID may be associated with each "category ID" (not illustrated).

Next, a point will be explained that a mode of sound data is changed in accordance with a category of sound contents to be output regardless of which application of the plurality of applications the sound contents to be output are provided from with reference to examples of the sound contents A-2 and D-3.

For example, assume that the agent information generating unit 632-1 of the agent device 60-1 generates the sound contents A-2 according to message information on contents having the category "advertisement" on the basis of data regarding a situation acquired from the situation grasping device 30. In such a case, the agent device 60-1 transmits the sound contents A-2 to the sound output control device 100 while adding thereto a category ID "CT4" identifying the category "advertisement" as illustrated in FIG. 5 such that the sound contents A-2 is output to the user U1. At this time, the agent device 60-1 may further imparts the app ID "AP1" for identifying the app AP1, which is an application of a providing source that provides the sound contents A-2.

The information acquiring unit 133 acquires, as sound contents to be output, the sound contents A-2 to which the category ID "CT4" is imparted from the agent device 60-1. Next, when the sound contents A-2 is determined as sound contents to be output from the reporting unit of the terminal device 10 by processing by the queuing unit 132 and the determination unit 134, the reporting control unit 135 executes reporting control processing with respect to message information included in the sound contents A-2 of the determined output target by using a timbre parameter according to a category of the sound contents A-2.

According to the example illustrated in FIG. 5, the reporting control unit 135 compares the category ID "CT4" imparted to the sound contents A-2 with the category group database 121 to be capable of specifying that a category of the sound contents A-2 is the "advertisement". In addition, the reporting control unit 135 recognizes that it is defined to change a voice message to be output from the reporting unit of the terminal device 10 to the timbre of characteristics of "robot voice+slowly" with reference to the category group database 121. Next, the reporting control unit 135 performs a sound synthesis using a parameter indicating the "robot voice+slowly" with respect to the sound data included in the sound contents A-2 so as to change a timbre of the sound.

Next, the reporting control unit 135 performs sound output control so as to cause the reporting unit of the terminal device 10 of the user U1 to report a voice message after the sound synthesis of the sound contents A-2. For example, the reporting control unit 135 transmits a voice message after the sound synthesis of the sound contents A-2 to the terminal device 10 of the user U1 so as to execute control for outputting a voice message corresponding to the sound contents A-2. The terminal device 10 causes the reporting unit thereof to report the voice message in accordance with the sound output control executed from the reporting control unit 135. Thus, the user U1 is able to easily grasp that sound contents currently being output have the category "advertisement".

Further, for example, assume that the agent information generating unit 632-4 of the agent device 60-4 generates sound contents D-3 corresponding to message information of a content that has the category "advertisement" on the basis of data regarding a situation acquired from the situation grasping device 30. In such a case, the agent device 60-4 transmits the sound contents D-3 to the sound output control device 100 while adding thereto the category ID "CT4" for identifying the category "advertisement" as illustrated in FIG. 5 such that the sound contents D-3 is output to the user U1. At this time, the agent device 60-1 may further imparts thereto an app ID "AP4" for identifying the app AP4 that is an application of a providing source providing the sound contents D-3.

The information acquiring unit 133 acquires from the agent device 60-4, as the sound contents to be output, the sound contents D-3 to which the category ID "CT4" is imparted. Next, when the sound contents D-3 is determined as sound contents to be output from the reporting unit of the terminal device 10 in processing executed by the determination unit 134, the reporting control unit 135 executes reporting control processing with respect to message information included in the sound contents D-3 of the determined output target by using a timbre parameter according to a category of the sound contents D-3.

According to the example illustrated in FIG. 5, the reporting control unit 135 compares the category ID "CT4" imparted to the sound contents D-3 with the category group database 121 to be capable of specifying that a category of the sound contents D-3 is the "advertisement". In addition, the reporting control unit 135 recognizes that a voice message to be output from the reporting unit of the terminal device 10 is defined to be changed into a timbre of the characteristics of "robot voice+slowly" with reference to the category group database 121. Next, the reporting control unit 135 performs a sound synthesis using the parameter indicating the "robot voice+slowly" with respect to the sound data included in the sound contents D-3 so as to change a timbre of the sound.

Next, the reporting control unit 135 performs a sound output control such that a voice message after the sound synthesis of the sound contents D-3 is reported from the reporting unit of the terminal device 10 of the user U1. For example, the reporting control unit 135 transmits a voice message after the sound synthesis of the sound contents D-3 to the terminal device 10 of the user U1 so as to execute control for outputting a voice message corresponding to the sound contents D-3. The terminal device 10 causes the reporting unit to report a voice message in accordance with the sound output control executed from the reporting control unit 135. Thus, the user U1 is able to easily grasp that the sound contents currently being output has the category "advertisement".

Here, according to the two examples described above, apps of providing sources that provide sound contents are different from each other such as the app AP1 and the app AP4. However, each of the sound contents provided from both apps belongs to the same category (advertisement) together, and thus the sound contents are output in a state in which the sound contents are changed to the same mode (robot voice+slowly) regardless of a type of the app.

In addition, a sound effect (for example, sound effect or background sound such as BGM) according to a category of sound contents to be output may be imparted to the sound contents regardless of which application of the plurality of applications the sound contents are provided from.

So far, while exemplifying a part of the sound contents illustrated in FIG. 5, a specific example of the sound output control method performed in the first information processing has been explained. Other sound contents illustrated in FIG. 5 can be explained similarly to the example of the part of the sound contents, and thus detailed explanations thereof are omitted.

4. Processing Procedure

Next, a procedure for information processing according to the first embodiment will be explained with reference to FIG. 6. FIG. 6 is a flowchart illustrating an information processing procedure according to the first embodiment. A flow indicated in the flowchart illustrated in FIG. 6 is repeatedly executed while the user U1 is driving a vehicle VE1, for example.

First, the control unit 130 of the sound output control device 100 determines whether or not agent information is acquired from the agent device 60-*x* (Step S101). In a case where it is determined that new agent information is acquired (Step S101: Yes), the control unit 130 executes queuing processing regarding the acquired agent information (Step S102). In Step S102, the control unit 130 executes queuing on newly acquired agent information along with the already-acquired agent information, and further decides a priority of the agent information in outputting it as a voice message, and shifts the processing to Step S103. On the other hand, in Step S101, in a case where it is determined that new agent information has not been acquired from the agent device 60-*x* (Step S101: No), directly shifts the processing to Step S103.

Next, the control unit 130 determines whether or not there presents agent information at an output timing from among pieces of the agent information acquired from the agent device 60-*x* (Step S103). In a case where determining that agent information at an output timing is not present (Step S103: No), the control unit 130 ends the flow once, and repeats the flow from the beginning.

On the other hand, in a case where determining that agent information at an output timing is present (Step S103: Yes), the control unit 130 specifies a category of the above-mentioned agent information on the basis of the category ID imparted to the agent information to be output (Step S104). For example, the control unit 130 compares the category ID that is imparted to agent information to be output with the category group database 121 so as to specify a category of the agent information to be output.

Further, as indicated in the example of the category group database 121 illustrated in FIG. 3, the control unit 130 specifies timbre characteristics corresponding to the specified category from among timbre characteristics (timbre parameters) that are set to be different between the categories (Step S105).

Next, the control unit 130 changes a parameter of the sound synthesis, which is used in converting message information included in agent information to be output to the sound data, into a specified timbre parameter (timbre parameter corresponding to category of agent information to be output), and further executes sound conversion (Step S106).

Lastly, the control unit 130 performs sound output control such that sound data corresponding to the agent information to be output is reported from the reporting unit of the terminal device 10 of a user that is designated as a providing destination of the agent information (Step S107). Next, the control unit 130 repeats the flow from the beginning.

In the flowchart illustrated in FIG. 6, the processing is explained, which is for specifying agent information at an output timing and then converting message information included in specified agent information into sound data; however, the timing to convert message information into sound data is not limited thereto. For example, conversion processing to sound data, which is corresponding to Steps S104 to S106, may be executed immediately after the information acquiring unit 133 acquires new agent information, and then processing for determining a priority of an output and processing for determining an output timing, which are corresponding to Steps S102 and S103, may be executed with respect to sound contents including the converted sound data.

5. Summary

The sound output control device 100 according to the first embodiment acquires agent information to be output as information to be provided to a user from agent devices that are capable of outputting agent information having respective different categories. Next, the sound output control device 100 causes the reporting unit to output a voice message corresponding to the agent information to be to be output. Specifically, the sound output control device 100 changes a mode of the voice message to change in accordance with a category of the agent information to be output, and further causes the reporting unit to report the voice message. According to the above-mentioned sound output control device 100, the user U1 is able to easily grasp whether or not sound contents currently being output are sound contents having a desired category.

Second Embodiment

From here, the second embodiment will be explained. Information processing according to the second embodiment (that is, second information processing) is executed for the purpose of solving the second problem described above. Specifically, the second information processing is executed by a sound output control device 200 corresponding to a sound output control device SV illustrated in FIG. 1. The sound output control device 200 executes the second information processing according to a sound output control program according to the second embodiment. Further, the sound output control device 200 has a configuration constituted of an application type database 223, in addition to the category group database 121 (see FIG. 3) and a content buffer 122 (see FIG. 4).

Figure 7:
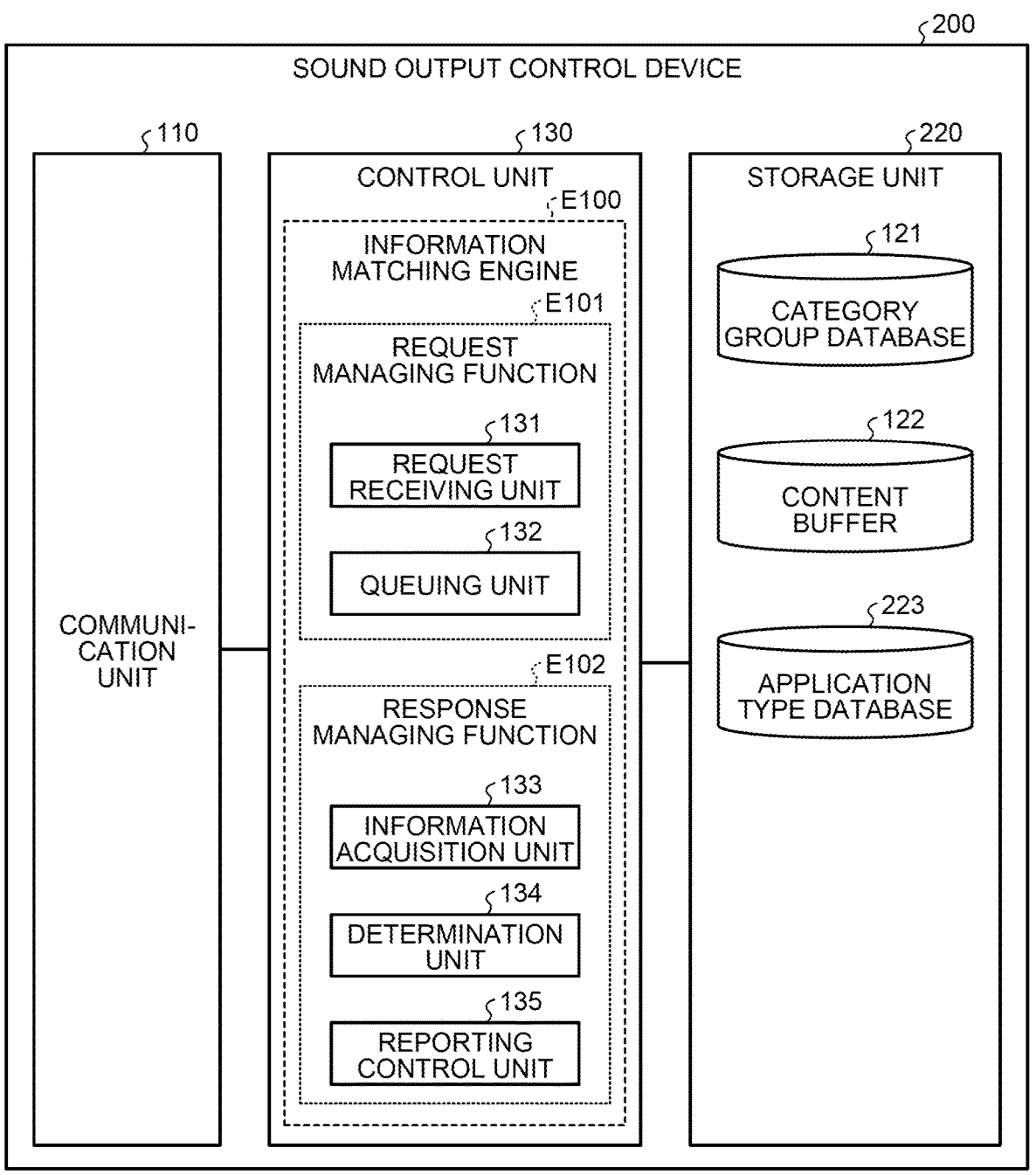
FIG. 7 is a diagram illustrating a configuration example of a sound output control device according to a second embodiment.

2. Configuration of Sound Output Control Device According to Second Embodiment Next, the sound output control device 200 according to the second embodiment will be explained with reference to FIG. 7. FIG. 7 is a diagram illustrating a configuration example of the sound output control device 200 according to the second embodiment. As illustrated in FIG. 7, the sound output control device 200 includes the communication unit 110, a storage unit 220, and the control unit 130. In the following explanation, there is a case where the explanations are omitted or simplified regarding a processing unit provided with the same signs as the sound output control device 100.

(Storage Unit 220)

The storage unit 220 is implemented by a semiconductor memory element such as a RAM and a flash memory, or a storage device such as a hard disk and an optical disk. The storage unit 220 includes the category group database 121, the content buffer 122, and an application type database 223.

(Application Type Database 223)

The application type database 223 stores therein information regarding sound effects. Here, an example of the application type database 223 according to the second embodiment is illustrated in FIG. 8. In the example illustrated in FIG. 8, the application type database 223 includes items such as "app ID", "app type", and "sound effects".

"App ID" indicates identification information for identifying an application (or agent device 60-*x* corresponding to the application) of a providing source that provides "sound contents" to be output. The application of the providing source can be rephrased as an application of a generation source that generates "sound contents" to be output. The "app type" is information regarding a type of the application identified by "App ID", and may be, for example, a name of the application. Further, the "app type" corresponds to a type of sound contents to be output (agent information), which is provided by an application identified by the app ID.

The "sound effect" is a candidate of a background sound to be overlapped with sound contents to be output in accordance with an application of a providing source that provides the sound contents to be output, and the background sound may be a sound effect or music, for example.

In the example illustrated in FIG. 8, a sound effect "sound effect #1" is associated with an app ID "AP1". The above-mentioned example indicates an example in which it is defined to report the sound contents in a state in which in a case where an application of a providing source that provides sound contents to be output is the app AP1, the sound effect #1 is overlapped, as the background sound, with sound data (voice message) included in the sound contents to be output.

(Information Acquiring Unit 133)

The information acquiring unit 133 acquires sound contents to be output, as information to be provided to a user from an agent device capable of outputting sound contents having a plurality of types that is distinguished by contents of the information or a providing source of the information.

For example, the information acquiring unit 133 is the agent device 60-*x* capable of outputting sound contents provided from each of the plurality of applications, and further acquires sound contents to be output from the agent device 60-*x* corresponding to an agent function included in the application.

(Reporting Control Unit 135)

The reporting control unit 135 causes the reporting unit to output sound data corresponding to sound contents to be output.

Further, the reporting control unit 135 imparts, to the sound data, a background sound corresponding to a type of the sound contents to be output, and further causes the reporting unit to report the sound data.

For example, as a type of sound contents to be output, the reporting control unit 135 imparts, to sound data, a background sound corresponding to an application of a providing source that provides the sound contents to be output, and further causes the reporting unit to report the sound data. In such a case, app identification information, which is for identifying an application of a providing source that provides sound contents, is imparted to each of the sound contents acquired from the agent device 60-*x*. Therefore, the reporting control unit 135 causes the reporting unit to output sound contents while adding thereto a background sound corresponding to an application of the plurality of applications indicated by the app identification information.

Further, the sound contents having a plurality of types may include sound contents having a plurality of different categories that are distinguished on the basis of contents of the sound contents. In such a case, the information acquiring unit 133 acquires, from the agent device 60-*x*, sound contents to be output from among sound contents having a plurality of different categories. Next, of the background sounds which are different among the plurality of different categories, the reporting control unit 135 imparts, to a voice message, a background sound corresponding to a category of the sound contents to be output, and further causes the reporting unit to report the voice message. As a specific example, the information acquiring unit 133 is the agent device 60-*x* capable of outputting sound contents provided from each of the plurality of applications, and acquires sound contents to be output from the agent device 60-*x* corresponding to an agent function included in the corresponding application. Next, regardless of which application of the plurality of applications the agent information is provided from, the reporting control unit 135 imparts, to sound data, a background sound according to a category of the sound contents to be output, and further causes the reporting unit to report the sound data.

In addition, as described in the first embodiment, the reporting control unit 135 may control the reporting unit such that a voice message is reported with timbre according to a category of sound contents to be output. In such a case, category identification information for identifying a category of sound contents is imparted to each of the sound contents acquired from the agent device 60-*x*. Therefore, the reporting control unit 135 controls the reporting unit such that the sound data is reported with the timbre according to the category indicated by the category identification information that is imparted to the sound contents to be output.

3. Specific Example of Sound Output Control Method

Figure 9:
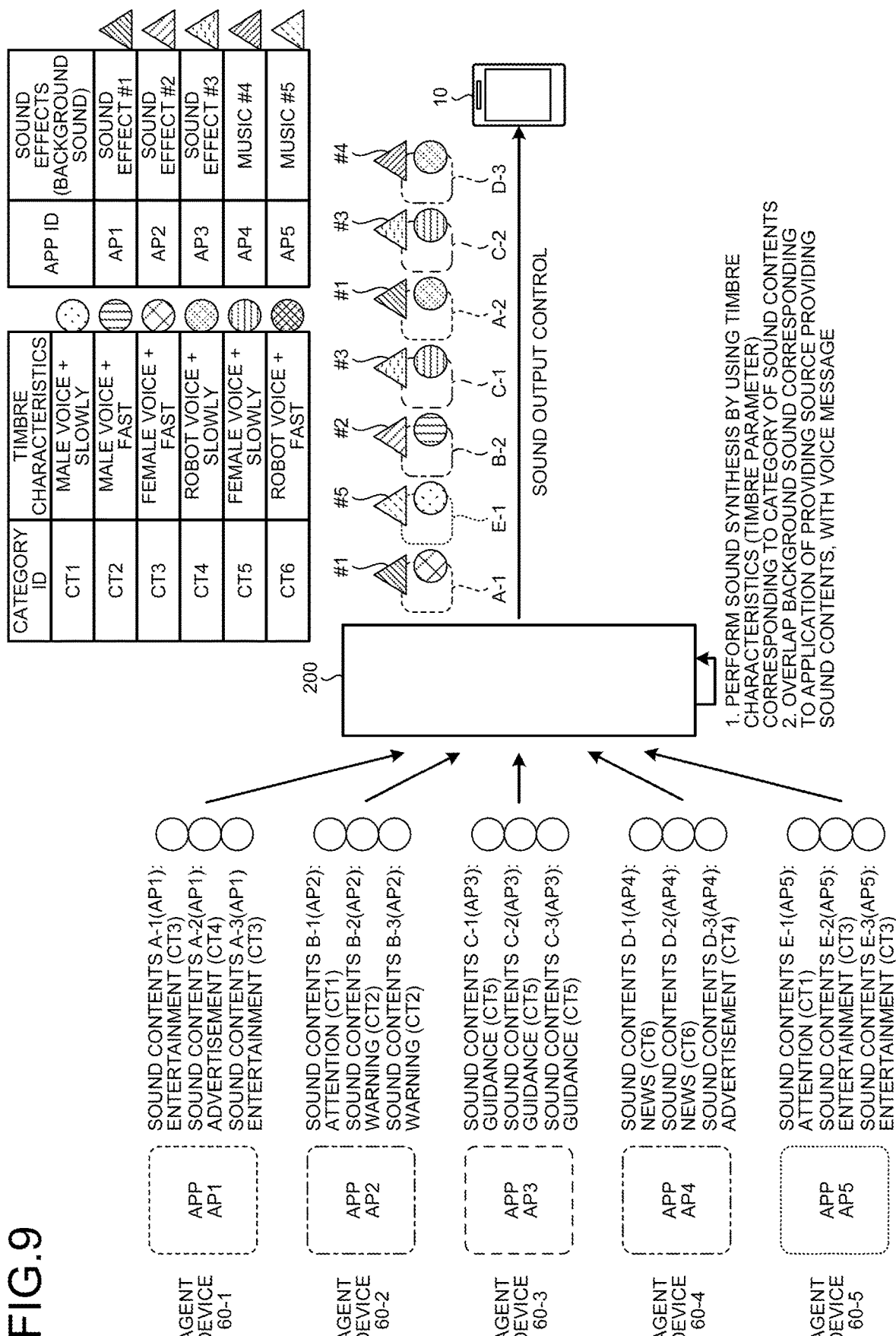
FIG. 9 is a diagram illustrating an example of a sound output control method according to the second embodiment.

Next, a specific example of a sound output control method performed in a second information processing will be explained with reference to FIG. 9. FIG. 9 is a diagram illustrating an example of the sound output control method according to the second embodiment.

Most part of FIG. 9 corresponds to the example illustrated in FIG. 5. Specifically, in FIG. 9, as a plurality of apps, five applications such as the app AP1, an app AP2, an app AP3, an app AP4, and an app AP5 (apps AP1 to AP5) are illustrated. In addition, the agent device 60-1, the agent device 60-2, the agent device 60-3, the agent device 60-4, and the agent device 60-5 are illustrated in FIG. 5, as the agent devices 60-*x* each capable of causing the reporting unit to output sound contents provided from each of the apps AP1 to AP5. Explanation of the agent devices 60-*x* is omitted here.

Here, for example, assume that the agent information generating unit 632-1 of the agent device 60-1 generates sound contents A-1 by using sound data corresponding to message information having contents of the category "entertainment" on the basis of data regarding a situation acquired from the situation grasping device 30. In such a case, the agent device 60-1 imparts, to the sound contents A-1, the category ID "CT3" for identifying the category "entertainment" as illustrated in FIG. 9 such that the sound contents A-1 is output to the user U1. In addition, the agent device 60-1 further imparts, to the sound contents A-1, the app ID "AP1" for identifying the app AP1 that is an application of a providing source providing the sound contents A-1. Next, the agent device 60-1 transmits the sound contents A-1, to which a category ID and an app ID are imparted, to the sound output control device 200.

The information acquiring unit 133 of the sound output control device 200 acquires the sound contents A-1, to which the app ID "AP1" and the category ID "CT3" are imparted, as the sound contents to be output from the agent device 60-1. Next, when the sound contents A-1 is determined as sound contents to be output from the reporting unit of the terminal device 10 by processing executed by the queuing unit 132 and the determination unit 134, the reporting control unit 135 performs sound synthesis by using a timbre parameter corresponding to a category of the sound contents A-1 with respect to message information included in the sound contents A-1 of the determined output target.

According to the example illustrated in FIG. 9, similar to the first embodiment, the reporting control unit 135 compares the category ID "CT3" imparted to the sound contents A-1 with the category group database 121 to be capable of specifying that a category of the sound contents A-1 is the "entertainment". In addition, the reporting control unit 135 recognizes that the voice message to be output from the reporting unit of the terminal device 10 to is defined to be changed into a timbre of characteristics of "female voice+fast" with reference to the category group database 121. Next, the reporting control unit 135 performs sound synthesis by using a parameter indicating the "female voice+fast" with respect to sound data included in the sound contents A-1 so as to change a timbre of the sound.

In the second embodiment, in addition to aforementioned, the sound output control device 200 outputs a background sound corresponding to an application of a providing source providing the sound contents A-1 while overlapping therewith a voice message.

For example, the reporting control unit 135 compares the app ID "AP1" imparted to the sound contents A-1 with the application type database 223 so as to specify that an app type of the sound contents A-1 is the "app AP1".

In addition, the reporting control unit 135 extracts the sound effect #1 from the application type database 223 in accordance with a fact that an app type of the sound contents A-1 is the "app AP1". Next, the reporting control unit 135 imparts, as a background sound, the extracted sound effect #1 to a voice message after the sound synthesis.

Next, the reporting control unit 135 performs sound output control such that the sound contents A-1 after conversion processing such as sound synthesis or impartment of a background sound is performed as described above are reported from the reporting unit of the terminal device 10 of the user U1. For example, the reporting control unit 135 transmits, to the terminal device 10 of the user U1, the sound contents A-1 after the conversion processing so as to execute control for outputting the sound contents A-1 after the conversion processing. The terminal device 10 reports the sound contents A-1 after the conversion processing from the reporting unit in accordance with sound output control executed from the reporting control unit 135. Thus, a voice message of the "female voice+fast" is output to the user U1 having, for example, a sound effect such as "pip pip pip pip . . . " (example of sound effect #1) as a background sound. That is, the user U1 can hear a voice message having a timbre according to a category of sound contents simultaneously with the background sound corresponding to the application of the providing source. As a result, the user U1 is able to easily grasp that sound contents currently being output have the category "entertainment", which is provided from the app AP1.

Next, another example illustrated in FIG. 9 will be explained. For example, assume that an agent information generating unit 631-5 of the agent device 60-5 generates sound contents E-1 by using sound data corresponding to message information on contents having the category "attention" on the basis of data regarding a situation acquired from the situation grasping device 30. In such a case, the agent device 60-5 imparts the category ID "CT1" for identifying the category "attention" to the sound contents E-1 as illustrated in FIG. 9 such that the sound contents E-1 are output to the user U1. In addition, the agent device 60-5 further imparts, to the sound contents E-1, an app ID "AP5" for identifying the app AP5 that is an application of a providing source providing the sound contents E-1. Next, the agent device 60-5 transmits, to the sound output control device 200, the sound contents A-1 to which the category ID and the app ID are imparted.

The information acquiring unit 133 acquires the sound contents E-1 to which the app ID "AP5" and the category ID "CT1" are imparted as sound contents to be output from the agent device 60-5. Next, when the sound contents E-1 is determined as sound contents to be output from the reporting unit of the terminal device 10 in the processing executed by the queuing unit 132 and the determination unit 134, the reporting control unit 135 performs sound synthesis using by a timbre parameter according to a category of the sound contents E-1 with respect to message information included in the sound contents E-1 of the determined output target.

According to the example illustrated in FIG. 9, the reporting control unit 135 compares the category ID "CT1" imparted to the sound contents E-1 with the category group database 121 to be capable of specifying that the category of the sound contents E-1 is the "attention". In addition, the reporting control unit 135 recognizes that a voice message to be output from the reporting unit of the terminal device 10 is defined to be changed into a timbre of characteristics of "male voice+slowly" with reference to the category group database 121. Next, the reporting control unit 135 performs the sound synthesis by using a parameter indicating the "male voice+slowly" with respect to sound data included in the sound contents E-1 so as to change a timbre of the sound.

Further, the reporting control unit 135 compares the app ID "AP5" imparted to the sound contents E-1 with the application type database 223 to be capable of specifying that an app type of the sound contents E-1 is the "app AP5".

In addition, the reporting control unit 135 extracts music #5 from the application type database 223 in accordance with a fact that an app type of the sound contents E-1 is the "app AP5". Next, the reporting control unit 135 imparts the extracted music #5 to a voice message after the sound synthesis as a background sound.

Next, the reporting control unit 135 performs the sound output control such that the sound contents E-1 after the conversion processing such as the sound synthesis or the impartment of the background sound as described above are reported from the reporting unit of the terminal device 10 of the user U1. For example, the reporting control unit 135 transmits, to the terminal device 10 of the user U1, the sound contents E-1 after the conversion processing so as to execute control for outputting the sound contents E-1 after the conversion processing. The terminal device 10 reports the sound contents E-1 after the conversion processing from the reporting unit in accordance with sound output control executed from the reporting control unit 135. Thus, the voice message of the "male voice+slowly" is output to the user U1 having the music #5 as a background sound. That is, the user U1 is able to hear a voice message of a timbre according to a category of sound contents simultaneously with a background sound corresponding to an application of the providing source. As a result, the user U1 is able to easily grasp that sound contents currently being output have the category "attention" provided from the app AP5.

So far, while exemplifying a part of sound contents indicated in FIG. 9, a specific example of the sound output control method performed in the second information processing has been explained. Other sound contents illustrated in FIG. 9 can be explained similarly to the example of the part of the sound contents, and thus detailed explanations thereof are omitted.

4. Processing Procedure

Figure 10:
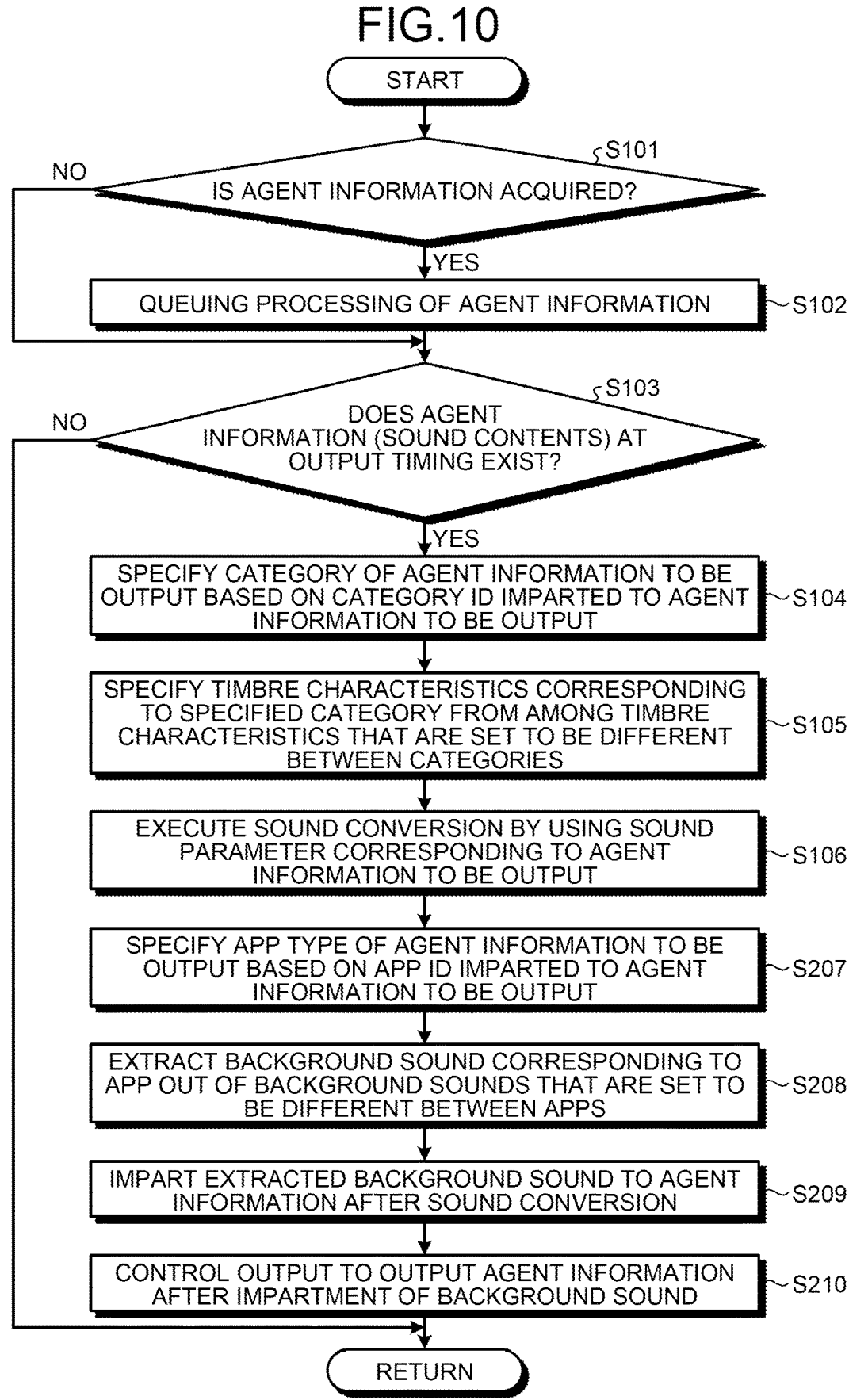
FIG. 10 is a flowchart illustrating an information processing procedure according to the second embodiment.

Next, a procedure for information processing according to the second embodiment will explained with reference to FIG. 10. FIG. 10 is a flowchart indicating an information processing procedure according to the second embodiment. With respect to Steps S101 to S106 illustrated in FIG. 10, explanations are omitted since the explanations thereof are common to the examples illustrated in FIG. 6, and Steps S207 to S210 will be explained, which are newly added in the information processing according to the second embodiment.

The control unit 130 specifies an app type of agent information to be output on the basis of the app ID imparted to the agent information to be output (Step S207). For example, the control unit 130 compares the app ID with the application type database 223 to be capable of specifying an app type of the agent information to be output.

Further, as indicated in the example of the application type database 223 illustrated in FIG. 8, the control unit 130 extracts a background sound corresponding to a specified app type of background sounds that are set to be different between the apps (Step S208).

Further, the control unit 130 imparts the extracted background sound to agent information after sound conversion (Step S209).

Lastly, the reporting control unit 135 performs sound output control such that the agent information after impartment of the background sound is reported from the reporting unit of the terminal device 10 of the user U1 (Step S210).

In the flowchart illustrated in FIG. 10, the processing for converting message information included in specified agent information into sound data and further imparting a background sound after specifying the agent information at an output timing is explained; however, the timing to convert message information into sound data and the timing to impart a background sound are not limited thereto. For example, the conversion processing to sound data, which is corresponding to Steps S104 to S106, and the impartment processing of a background sound, which is corresponding to Steps S207 to S209, may be executed immediately after the information acquiring unit 133 acquires new agent information, and then processing for determining a priority of an output and processing for determining an output timing, which are correspond to the steps S102 and S103, may be executed with respect to sound contents including the sound data after imparting the background sound.

So far, as the second embodiment, it is explained that the sound output control device 200 overlaps a background sound corresponding to an application of a providing source with a voice message having a timbre according to a category of the sound contents, and outputs the voice message; however, as another example, the sound output control device 200 may overlap the background sound corresponding to a category of sound contents with a voice message having a timbre corresponding to an application of a providing source, and output the voice message. For example, the reporting control unit 135 may perform sound synthesis by using a timbre parameter corresponding to the app A1, and further impart a background sound according to the category "entertainment" to a voice message in a case where an application of a providing source of sound contents is the app AP1 and message information included in the sound contents having the category "entertainment". In such a case, for example, in the category group database 121 illustrated in FIG. 3, data of a background sound according to a category indicated by the category ID is associated by each "category ID", and in addition, in the application type database 223 illustrated in FIG. 8, sound characteristics (timbre parameter) corresponding to the app type indicated by the app ID are associated for each "app ID".

In this case also, the user U1 is bale to hear a voice message having a timbre corresponding to an application of a providing source simultaneously with a background sound according to a category of sound contents. As a result, the user U1 is able to easily grasp an application to be a providing source of sound contents currently being output and a category of the sound contents.

Alternatively, as further another example, the sound output control device 200 may constantly fix a timbre of a sound in a voice message to a standard timbre, and further change a background sound alone in accordance with a category of the sound contents. That is, regardless of which application of a plurality of applications sound contents are provided from, the background sound according to a category of the sound contents to be output may be imparted. In this case also, the user U1 is able to hear a background sound according to a category of the sound contents simultaneously with a voice message. As a result, the user U1 is able to easily grasp a category of sound contents currently being output.

5. Summary

The sound output control device 200 according to the second embodiment acquires agent information to be output as information to be provided to a user from an agent device capable of outputting a content of information or agent information having a plurality of types distinguished by a providing source of the information. Next, the sound output control device 200 causes the reporting unit to output a voice message corresponding to the agent information to be output. Specifically, the sound output control device 200 imparts a background sound corresponding to a type of the agent information to be output to the voice message, and further causes the reporting unit to report the voice message. According to the above-mentioned sound output control device 200, a user is able to easily grasp whether or not sound contents currently being output are sound contents having a desired type.

Third Embodiment

1. Summary of Third Embodiment

From here, a third embodiment will be explained. Information processing according to the third embodiment (that is, third information processing) is executed for the purpose of solving the third problem described above. Specifically, the third information processing is executed by a sound output control device 300 corresponding to the sound output control device SV illustrated in FIG. 1. The sound output control device 300 executes the third information processing in accordance with a sound output control program according to the third embodiment.

2. Configuration of Sound Output Control Device According to Third Embodiment Next, the sound output control device 300 according to the embodiment will be explained with reference to FIG. 11.

Figure 11:
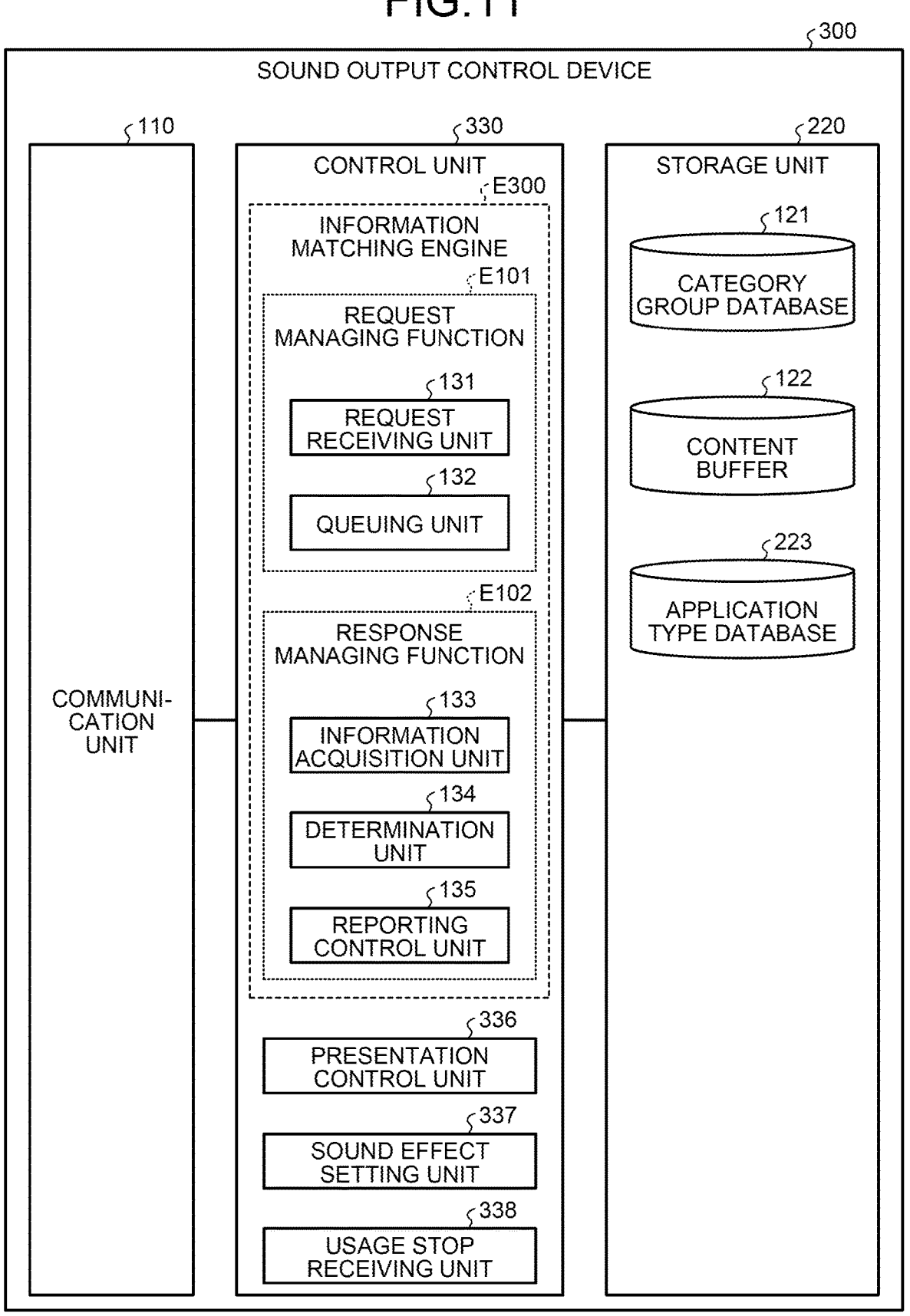
FIG. 11 is a diagram illustrating a configuration example of a sound output control device according to a third embodiment.

FIG. 11 is a diagram illustrating a configuration example of the sound output control device 300 according to the third embodiment. As illustrated in FIG. 11, the sound output control device 300 includes the communication unit 110, the storage unit 220, and a control unit 330. In the following explanation, there is a case where explanations are omitted or simplified regarding a processing unit that is provided with the same signs as the sound output control device 100 and the sound output control device 200.

(Control Unit 330)

A CPU, a MPU, or the like executes various programs (for example, sound output control program) stored in a storage device in the sound output control device 300 while using a RAM as a working area so as to implement the control unit 330. Further, the control unit 330 is implemented by an integrated circuit such as an ASIC and an FPGA.

As illustrated in FIG. 11, the control unit 330 further includes a presentation control unit 336, a sound effect setting unit 337, and a usage stop receiving unit 338; and implements or executes functions and effects of information processing explained below. An internal configuration of the control unit 330 is not limited to the configuration illustrated in FIG. 11, and may have another configuration as long as the configuration executes the following information processing. Further, connection relationship between processing units included in the control unit 330 is not limited to the connection relationship illustrated in FIG. 11, and may be other connection relationship.

(Presentation Control Unit 336)

As explained in the second embodiment, the reporting control unit 135 causes a reporting unit to report a voice message to which different sound effects of a plurality of applications are imparted in accordance with an application of a plurality of applications, which is a providing source of sound contents acquired by the information acquiring unit 133. Next, the presentation control unit 336 presents an application list that indicates sound effects corresponding to each of the plurality of applications to a user.

For example, the presentation control unit 336 executes control for presenting image information indicating the application list to the user through a display unit (for example, display screen of terminal device 10).

Further, the presentation control unit 336 causes the reporting unit to report a voice message indicating a name of an application included in the application list in a state in which sound effects corresponding to the application are imparted thereto.

(Sound Effect Setting Unit 337)

The sound effect setting unit 337 receives a user operation for setting sound effects for each of the applications.

(Usage Stop Receiving Unit 338)

The usage stop receiving unit 338 receives a user operation for stopping usage of an arbitrary application of the plurality of applications used by the user. For example, the usage stop receiving unit 338 stops the usage of an application selected by the user from among applications included in the application list.

3. Specific Example of Third Information Processing

Figure 12:
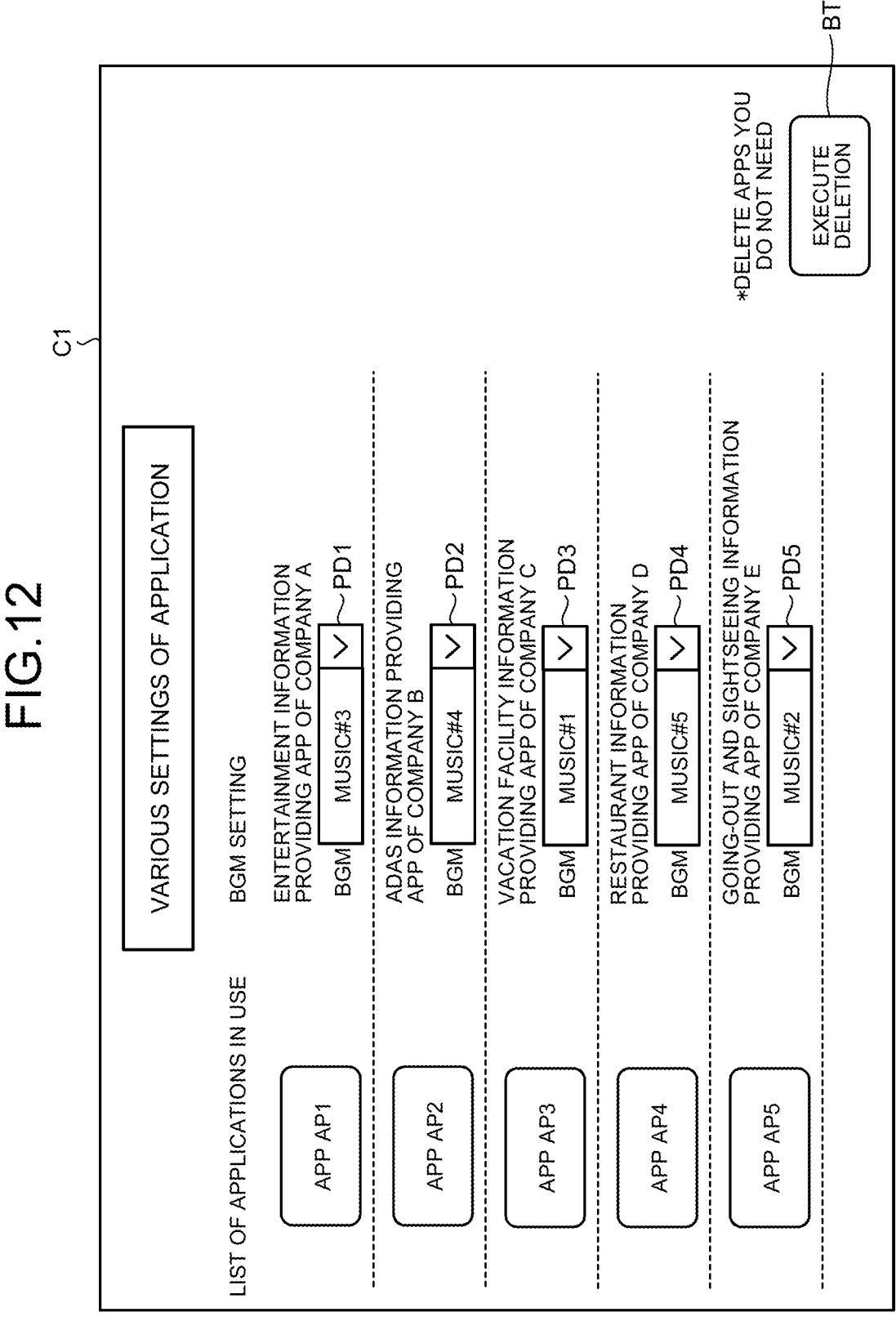
FIG. 12 is a diagram illustrating an example of information processing according to the third embodiment.

Next, a specific example of a third information processing executed between the presentation control unit 336, the sound effect setting unit 337, and the usage stop receiving unit 338 will be explained with reference to FIG. 12. FIG. 12 is a diagram illustrating an example of the third information processing.

An example is illustrated in FIG. 12 that a setting screen C1 capable of setting various settings with respect to each of a plurality of applications linked to the terminal device 10 of the user U1 (app being used by user U1) is displayed on the terminal device 10. The setting screen C1 may be provided by the presentation control unit 336 in response to a request from the user U1, for example. In addition, a mode (screen configuration) of the setting screen C1 is not limited to the example illustrated in FIG. 12.

For example, assume that applications linked to the terminal device 10 of the user U1 are an app AP1, an app AP2, an app AP3, an app AP4, and an app AP5. In such a case, as illustrated in FIG. 12, app names that indicate respective names of apps AP1 to AP5 are displayed as a "list of applications in use" on the setting screen CT. In addition, the list of applications corresponds to an application list.

Further, on the setting screen C1, it is possible to set a background sound corresponding to an application for each of the applications that are linked to the terminal device 10 of the user U1. Regarding this point, in FIG. 12, an example is illustrated in which an area next to an app name indicating the app APT is associated with a pull-down button PD1 for list-displaying, in a pull-down manner, candidates of a background sound corresponding to the app APT. Thus, the user U1 selects an arbitrary background sound from among pull-down displayed candidates of a background sound by using the pull-down button PD1 to be able to set a selected background sound.

For example, as illustrated in FIG. 12, in a case where BGM "MUSIC #3" is selected, the sound effect setting unit 337 receives a setting of the BGM "MUSIC #3" with respect to the app APT in accordance with such a selecting operation. Further, corresponding to a fact that the setting of the BGM "MUSIC #3" is received, the presentation control unit 336 controls, for example, the reporting control unit 135 such that the sound data (voice message) indicating the app name of the app APT is output from the reporting unit in a state in which the BGM "MUSIC #3" is imparted. In such a case, the reporting control unit 135 extracts data of the BGM "MUSIC #3" from a storage unit, and imparts the data to sound data indicating the app name of the app APT. Next, the reporting control unit 135 performs sound output control such that the sound data after imparting the BGM "MUSIC #3" is reported from the reporting unit of the terminal device 10 of the user U1.

Thus, the user U1 is able to hear a voice message that loudly reads out the app name of the app APT (for example, it is "information providing app of company A"), and further is able to come to have an image of an atmosphere of the BGM "MUSIC #3" and how the voice message sounds in the atmosphere. In addition, as a result thereof, as indicated in the example illustrated in FIG. 12, the user U1 is able to easily distinguish which app is a providing source of sound contents in a case were a plurality of apps is used.

So far, the explanation regarding the specific example of the third information processing has been made with reference to the example of the app AP1 illustrated in FIG. 12, and here, an explanation on other applications will also be made.

For example, in FIG. 12, an example is illustrated in which a pull-down button PD3 for list-displaying, in the pull-down manner, candidates of a background sound corresponding to the app AP3 is associated with an area next to an app name indicating the app AP3. Thus, the user U1 selects an arbitrary background sound from among candidates of a background sound that are pull-down displayed by using the pull-down button PD3 to be able to set the selected background sound.

For example, as illustrated in FIG. 12, in a case where BGM "MUSIC #1" is selected, the sound effect setting unit 337 receives a setting of the BGM "MUSIC #1" with respect to the app AP3 in accordance with the selecting operation. Further, in response to a fact that the setting of the BGM "MUSIC #1" is received, the presentation control unit 336 controls, for example, the reporting control unit 135 such that sound data indicating an app name of the app AP3 is output from the reporting unit in a state in which the BGM "MUSIC #1" is imparted. In such a case, the reporting control unit 135 extracts data of the BGM "MUSIC #1" from the storage unit, and further imparts the data to sound data indicating the app name of the app AP3. Next, the reporting control unit 135 performs sound output control such that the sound data after the BGM "MUSIC #1" is imparted thereto is reported from the reporting unit of the terminal device 10 of the user U1.

Thus, the user U1 is able to hear a voice message that loudly reads out the app name of the app AP3 (for example, it is "vacation facility information providing app of company C"), and further is able to come to have an image of an atmosphere of the BGM "MUSIC #1" or how the voice message sounds in the atmosphere. In addition, as a result thereof, as indicated in the example illustrated in FIG. 12, the user U1 is able to easily distinguish which app is a providing source of sound contents in a case where a plurality of apps are used.

From here, with reference to the example illustrated in FIG. 12, usage stop of an app (deletion of unnecessary app) will be explained. The setting screen C1 illustrated in FIG. 12 further includes a function to delete an app that is selected from among apps included in an application list so as to turn the selected app into a state of a usage stop.

For example, assume that the user U1 thinks that provision of sound contents from the app AP1 from among the apps APT to AP5 that are being used is unnecessary, and wishes to turn the app APT into a state of a usage stop. In such a case, the user U1 depresses a deletion execution button BT while selecting the app APT from among app names included in the application list.

The usage stop receiving unit 338 receives a user operation for stopping a usage of the app APT. Next, the usage stop receiving unit 338 stops a usage of the app APT that is selected by the user U1 from among the apps included in the application list. For example, the usage stop receiving unit 338 deletes the app APT from the application list so as to stop a usage of the app APT. Thus, the user U1 is able to set an environment in which sound contents that are necessary for him/herself alone is output.

4. Summary

The sound output control device 300 according to the third embodiment acquires agent information provided from each of a plurality of applications having a voice agent function. The sound output control device 300 causes a reporting unit to report a voice message to which different sound effects are imparted in accordance with an application of the plurality of applications. The different sound effects are different between the plurality of applications. The application is a providing source of the agent information. In addition, the sound output control device 300 presents, to a user, an application list indicating sound effects corresponding to each of the plurality of applications. According to the above-mentioned sound output control device 300, the user is able to easily distinguish which app is a providing source of sound contents in a case where a plurality of apps is used, and as a result thereof, is further able to specify the app that fits a taste of him/herself.

Others

1. Hardware Configuration

Figure 13:
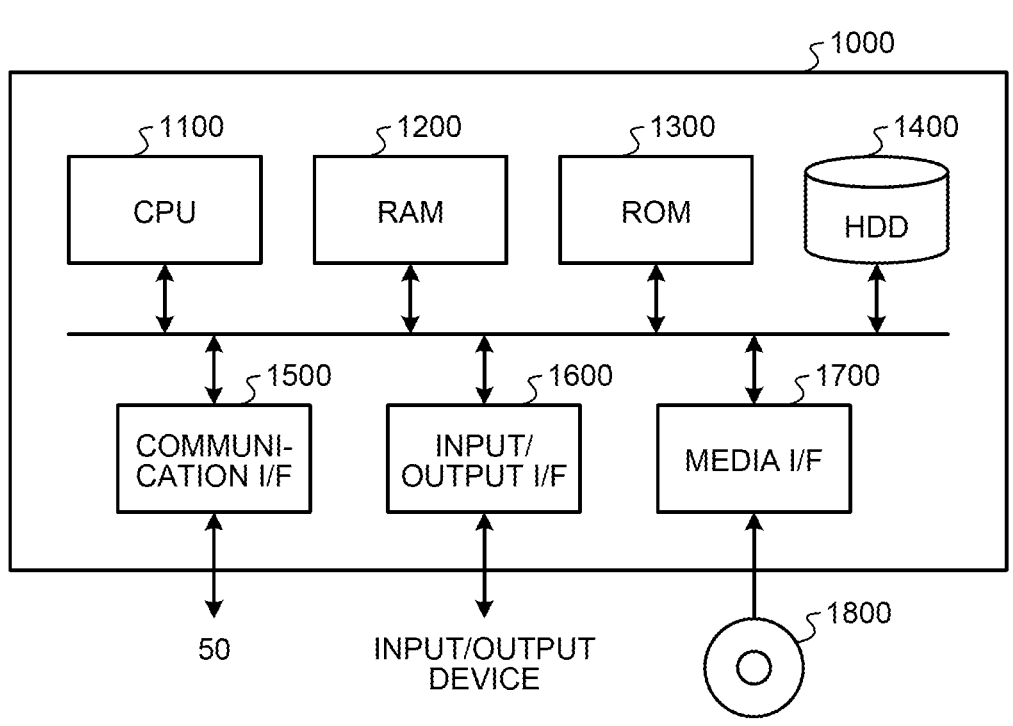
FIG. 13 is a hardware configuration diagram illustrating an example of a computer that implements functions of the sound output control devices.

Further, the sound output control device 100 according to the first embodiment and the sound output control device 200 according to the second embodiment that have been described above are implemented by, for example, a computer 1000 having a configuration illustrated in FIG. 13. Hereinafter, an explanation will be made while exemplifying the sound output control device 100. FIG. 13 is a hardware configuration diagram illustrating an example of a computer that implements a function of the sound output control device 100. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 operates on the basis of a program stored in the ROM 1300 or the HDD 1400, and performs control over each unit. The ROM 1300 stores therein a boot program to be executed by the CPU 1100 in starting up the computer 1000, a program that depends on hardware of the computer 1000, and the like.

The HDD 1400 stores therein a program to be executed by the CPU 1100, data to be used by the program, and the like. The communication interface 1500 receives data from another device through a predetermined communication network and transmits the received data to the CPU 1100, and further transmits data generated by the CPU 1100 to another device through a predetermined communication network.

The CPU 1100 controls an output device such as a display and a printer, and an input device such as a keyboard and a mouse through the input/output interface 1600. The CPU 1100 acquires data from the input device through the input/output interface 1600. In addition, the CPU 1100 outputs the generated data to the output device through the input/output interface 1600.

The media interface 1700 reads a program or data stored in a storage media 1800, and further provides the program or the data to the CPU 1100 through the RAM 1200. The CPU 1100 loads the program on the RAM 1200 from the storage media 1800 through the media interface 1700, and further executes the loaded program. The storage media 1800 is an optical recording medium such as a Digital Versatile Disc (DVD) and a Phase Change Rewritable Disk (PD), an optical magnetic recording medium such as a Magneto-Optical disk (MO), a tape medium, a magnetic recording medium, a semiconductor memory, or the like.

For example, in a case where the computer 1000 functions as the sound output control device 100 according to the first embodiment, the CPU 1100 of the computer 1000 executes programs loaded on the RAM 1200 so as to implement a function of the control unit 130. The CPU 1100 of the computer 1000 reads these programs from the storage medium 1800 and executes the read programs; however, as another example, the CPU 1100 may acquire these programs from another device through a predetermined communication network.

Further, for example, in a case where the computer 1000 functions as the sound output control device 300 according to the third embodiment, the CPU 1100 of the computer 1000 executes programs loaded on the RAM 1200 so as to implement a function of the control unit 330.

2. Others

Further, out of the processing explained in the above embodiments, whole or a portion of the processing explained to be automatically executed can also be executed manually, or, whole or a portion of the processing explained to be manually executed can be executed automatically by a conventional method. In addition, information including a processing procedure, a specific name, or various kinds of data or parameters illustrated in the text or the drawings described above can be arbitrarily changed unless otherwise specified. For example, various information shown in each of the drawings is not limited to the information shown in the drawings.

Further, each configuration element of each device shown in the drawings are functionally conceptual, and each device need not necessarily be physically configured as shown in the drawings. That is, a specific form of dispersion or integration of each of the devices is not limited to a form shown in the drawings, and the specific form can be configured by functionally or physically dispersing or integrating an entirety or a portion thereof at an arbitrary unit according to various loads or usage conditions.

Further, each of the embodiments above can be appropriately combined within a range in which contents of processing do not contradict each other.

Hitherto, some of the embodiments of the present application are explained in detail with reference to the drawings, however, these are examples, and it is possible to carry out the present invention in another form in which various variations and improvements including an aspect described in a column of a disclosure of the invention are applied based on knowledge of a person skilled in the art.

In addition, the words "section, module, unit" which have been described above can be replaced with "means" or "circuit" or the like. For example, an information acquiring unit can be replaced with an information acquiring means or an information acquiring circuit.

DESCRIPTION OF REFERENCE NUMERALS

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A sound output control device comprising:
   a memory; and
   a processor operatively connected to the memory, wherein the processor is configured to:
      acquire, as information to be provided to a user, agent information to be output from an agent device, the agent device being capable of outputting the agent information having one of a plurality of different categories;
      cause a speaker to output a voice message corresponding to the agent information to be output,
      acquire the agent information to be output from the agent device comprising a plurality of applications each of which is capable of providing the corresponding agent information;
      change a timbre of voice of the voice message in accordance with the category of the agent information to be output, regardless of which application of the plurality of applications the agent information is provided from, wherein different sound effects are respectively set for the plurality of applications;
   execute control for causing the speaker to report the voice message while imparting, to the voice message, the sound effects according to an application of a providing source that provides the agent information to be output from among the sound effects that are different between the plurality of applications; and
   present, to the user, an application list indicating the sound effects corresponding to each of the plurality of applications,
      wherein the category of the agent information is output with reference to a category group database that associates timbre characteristics of the timbre of voice with each of the plurality of different categories.

2. The sound output control device according to claim 1, wherein the processor is further configured to:
      execute control for causing the speaker to report the voice message while imparting, to the voice message, additional sound effects according to the category of the agent information to be output from among the plurality of different categories.

3. The sound output control device according to claim 1, wherein
      each piece of the agent information acquired from the agent device is imparted with corresponding category identification information that identifies a category of the corresponding agent information, and
      the processor is further configured to:
      change the timbre of the voice of the voice message in accordance with the category indicated by the category identification information imparted to the agent information to be output.

4. The sound output control device according to claim 1, wherein each piece of the agent information acquired from the agent device is imparted with corresponding application identification information that identifies an application of the providing source providing the agent information, and
   the processor is further configured to:
      execute control for causing the speaker to report the voice message while imparting, to the voice message, the sound effects according to the application indicated by the application identification information that is imparted to the agent information to be output from among the plurality of applications.

5. A sound output control method executed by a sound output control device, the method comprising:
      acquiring, as information to be provided to a user, agent information to be output from an agent device, the agent device being capable of outputting the agent information having one of a plurality of different categories, wherein the acquiring comprises acquiring the agent information to be output from the agent device comprising a plurality of applications each of which is capable of providing corresponding agent information;
      causing a speaker to output a voice message corresponding to the agent information to be output;
      changing a timbre of voice of the voice message in accordance with the category of the agent information to be output, regardless of which application of the plurality of applications the agent information is provided from, wherein different sound effects are respectively set for the plurality of applications;

executing control for causing the speaker to report the voice message while imparting, to the voice message, the sound effects according to an application of a providing source that provides the agent information to be output from among the sound effects that are different between the plurality of applications; and presenting, to the user, an application list indicating the sound effects corresponding to each of the plurality of applications, wherein the category of the agent information is output with reference to a category group database that associates timbre characteristics of the timbre of voice with each of the plurality of different categories.

6. A non-transitory computer-readable recording medium storing a sound output control program executed by a sound output control device comprising a processor, the sound output control program causing the processor to implement:

acquiring, as information to be provided to a user, agent information to be output from an agent device, the agent device being capable of outputting the agent information having one of a plurality of different categories, wherein the acquiring comprises acquiring the agent information to be output from the agent device comprising a plurality of applications each of which is capable of providing corresponding agent information;

causing a speaker to output a voice message corresponding to the agent information to be output;

changing a timbre of voice of the voice message in accordance with the category of the agent information to be output, regardless of which application of the plurality of applications the agent information is provided from, wherein different sound effects are respectively set for the plurality of applications;

executing control for causing the speaker to report the voice message while imparting, to the voice message, the sound effects according to an application of a providing source that provides the agent information to be output from among the sound effects that are different between the plurality of applications; and presenting, to the user, an application list indicating the sound effects corresponding to each of the plurality of applications, wherein the category of the agent information is output with reference to a category group database that associates timbre characteristics of the timbre of voice with each of the plurality of different categories.

7. The sound output control device according to claim 1, wherein the sound effects are different between the plurality of applications with reference to an application type database that associates the sound effects with each of the plurality of applications.

* * * * *